(12) United States Patent
Kamoun et al.

(10) Patent No.: US 12,494,838 B2
(45) Date of Patent: Dec. 9, 2025

(54) COOPERATIVE COMMUNICATION IN A WIRELESS NETWORK

(71) Applicant: HUAWEI TECHNOLOGIES CO., LTD., Shenzhen (CN)

(72) Inventors: Mohamed Kamoun, Boulogne Billancourt (FR); Juan Carlos Bucheli Garcia, Boulogne Billancourt (FR)

(73) Assignee: Huawei Technologies Co., Ltd., Shenzhen (CN)

( * ) Notice: Subject to any disclaimer, the term of this patent is extended or adjusted under 35 U.S.C. 154(b) by 268 days.

(21) Appl. No.: 18/339,022

(22) Filed: Jun. 21, 2023

(65) Prior Publication Data
US 2023/0344503 A1 Oct. 26, 2023

Related U.S. Application Data

(63) Continuation of application No. PCT/EP2020/087680, filed on Dec. 22, 2020.

(51) Int. Cl.
*H04B 7/08* (2006.01)
*H04W 28/08* (2023.01)
*H04W 76/20* (2018.01)

(52) U.S. Cl.
CPC .......... *H04B 7/0802* (2013.01); *H04W 28/08* (2013.01); *H04W 76/20* (2018.02)

(58) Field of Classification Search
CPC .. H04B 7/0802; H04B 7/026; H04B 7/04013; H04B 7/0617; H04W 28/08;
(Continued)

(56) References Cited

U.S. PATENT DOCUMENTS

| 2015/0319688 | A1* | 11/2015 | Matas Sanz | H04W 52/0206 |
| | | | | 455/574 |
| 2022/0038858 | A1* | 2/2022 | Rea | H04B 7/0617 |
| 2022/0085498 | A1* | 3/2022 | Mason | H04W 72/23 |

FOREIGN PATENT DOCUMENTS

| CA | 2822241 A1 | 4/2014 |
| WO | 2017048429 A1 | 3/2017 |

(Continued)

OTHER PUBLICATIONS

Nam et al., "Cooperative Communication Technologies for LTE-Advanced," 2010 IEEE International Conference on Acoustics, Speech and Signal Processing, Dallas, TX, pp. 5610-5613, IEEE—Institute of Electrical and Electronics Engineers, New York, New York (Jun. 2010).

(Continued)

*Primary Examiner* — Eric Myers
(74) *Attorney, Agent, or Firm* — Leydig, Voit & Mayer, Ltd.

(57) ABSTRACT

A receiving network node includes a first antenna array, one or more radio frequency components, one or more configurable loads, a switch, and a first control circuit. The first control circuit obtains instruction data for configuring the first antenna array from a transmit-receive mode to a scattering mode. The first control circuit configures the one or more configurable loads based on the instruction data to scatter a first beam of a radio frequency signal sent by a transmitting network node located in a first cell to a first user device located in a second cell. The first beam is scattered by the configured first antenna array. The first control circuit controls the switch to change a coupling of one or more antennas from the radio frequency components to the con- (Continued)

figured one or more configurable loads, and sets the radio frequency components to an idle mode for power-efficient cooperative communication.

17 Claims, 15 Drawing Sheets

(58) Field of Classification Search
CPC ....... H04W 76/20; Y02D 30/70; H01Q 15/14; H01Q 21/062; H01Q 21/29
See application file for complete search history.

(56) References Cited

FOREIGN PATENT DOCUMENTS

| | | |
|---|---|---|
| WO | 2018098698 A1 | 6/2018 |
| WO | 2018215415 A1 | 11/2018 |
| WO | 2019020894 A1 | 1/2019 |

OTHER PUBLICATIONS

Richter et al., "Energy Efficiency Aspects of Base Station Deployment Strategies for Cellular Networks," 2009 IEEE 70th Vehicular Technology Conference Fall, Anchorage, AK, IEEE—Institute of Electrical and Electronics Engineers, New York, New York, total 5 pages (Jan. 12, 2009).

Micallef et al., "Cell Size Breathing and Possibilities to Introduce Cell Sleep Mode," 2010 European Wireless Conference, pp. 111-115 (Jun. 2010).

Chen et al., "Experimental Investigation of Elimination Blindness Propagation Channel Using Reflectarray," Proceedings of the 2012 IEEE International Symposium on Antennas and Propagation, Chicago, IL, pp. 1-2, IEEE—Institute of Electrical and Electronics Engineers, New York, New York (Nov. 10, 2012).

Chen et al., "Reflectarray Development for Improving NLOS Radio Channel," 2013 Asia-Pacific Microwave Conference Proceedings (APMC), Seoul, pp. 654-656 (Nov. 5-8, 2013).

Tan et al., "Increasing Indoor Spectrum Sharing Capacity using Smart Reflect-Array," IEEE ICC 2016—Wireless Communications Symposium, Kuala Lumpur, total 6 pages, IEEE—Institute of Electrical and Electronics Engineers, New York, New York (Jul. 14, 2016).

Wang et al., "Experimental Investigation of MIMO Performance Using Passive Repeater in Multipath Environment," in IEEE Antennas and Wireless Propagation Letters, vol. 10, pp. 752-755, IEEE—Institute of Electrical and Electronics Engineers, New York, New York (Jul. 25, 2011).

Werther et al., "LTE System Specifications and their Impact on RF & Base Band Circuits Application Note," Computer Science, Engineering, total 37 pages (Apr. 2013).

"3rd Generation Partnership Project; Technical Specification Group Radio Access Network; Evolved Universal Terrestrial Radio Access (E-UTRA); Base Station (BS) radio transmission and reception (Release 11)," 3GPP TS 36.104 V11.2.0, total 128 pages, 3GPP—3rd Generation Partnership Project, Valbonne, France (Sep. 2012).

"3rd Generation Partnership Project; Technical Specification Group Radio Access Network; Evolved Universal Terrestrial Radio Access (E-UTRA); User Equipment (UE) radio transmission and reception (Release 13)," 3GPP TS 36.101 V13.3.0, total 928 pages, 3GPP—3rd Generation Partnership Project, Valbonne, France (Mar. 2016).

* cited by examiner

COOPERATIVE COMMUNICATION IN A WIRELESS NETWORK

CROSS-REFERENCE TO RELATED APPLICATIONS

This application is a continuation of International Application No. PCT/EP2020/087680, filed on Dec. 22, 2020, the disclosure of which is hereby incorporated by reference in its entirety.

TECHNICAL FIELD

The present disclosure relates generally to the field of wireless communication, and, more specifically, to a receiving network node, a transmitting network node, a central communication device, and methods for executing a cooperative communication in a wireless network (e.g., a cellular network).

BACKGROUND

With the rapid advancement in wireless networks (e.g., cellular networks) and emergence of new technologies, a tremendous growth in traffic (e.g., cellular traffic) is observed. Typically, in a wireless network, a substantial amount of energy is consumed to sustain operation of network nodes, such as base stations. In certain scenarios, cellular networks face a problem of under-load periods (i.e., low-traffic phases), during which many base stations need to be switched on while serving only a limited number of user devices. Therefore, various energy saving modes must be devised in order to reduce the energy consumption of the cellular networks, which in turn affects the operating cost of the network nodes (e.g., base stations).

Currently, certain attempts have been made to reduce the energy consumption of wireless networks (e.g., the cellular networks) using various deployment strategies. For example, in order to reduce the energy consumption in the low-traffic phases (or under-load periods), the most common solution involves selecting a set of network nodes (e.g., base stations) that may be switched off during low-traffic cycles. In the low-traffic phases (or under-load periods), lesser processing operations are required to serve the limited number of user devices, and, therefore, an idle network node (e.g., an idle base station) is usually switched off. This mode of energy saving is also known as a sleep mode and is used for reducing the energy consumption associated with the idle network node (e.g., idle base station). In the sleep mode, coverage of the conventional cellular network is ensured by remaining (or active) network nodes (e.g., active base stations), the cell radius and transmission power of which are usually increased to cover the area of the idle network node (e.g., the idle base station). However, in such a case, link budget of mobile users (e.g., user equipment) that are covered by the idle base station gets degraded. Additionally, a power consumption of the active base stations increases to cover additional areas (i.e., areas covered by the idle base station). Currently, a cell breathing mechanism is used to compensate the degradation of the link budget of the user devices covered by the idle network node (e.g., the idle base station). In the conventional cell breathing mechanism, active base stations with full traffic load reduce their communication areas through energy control and mobile users at edges of their communication areas are served by neighbouring base stations which have a low traffic load. The conventional cell breathing mechanism is used to increase the coverage of the active base stations by increasing a transmission power of the active base stations on both signalling and data channels. In addition to this, power management actions are used at the active base stations, which results in increasing the transmission power of the mobile users and the neighbouring base stations. In such scenarios, the idle base station is of no use in the deployment. Thus, there exists a technical problem of an inefficient power management of the network nodes (e.g., an increased transmission power of active base stations, neighbouring base stations, and user devices) resulting in a high operating cost in cellular networks.

Therefore, in light of the foregoing discussion, there exists a need to overcome the aforementioned drawbacks associated with the conventional network nodes and their operations in a wireless network (e.g., a cellular network).

SUMMARY

The present disclosure provides a receiving network node, a transmitting network node, a central communication device, and methods for executing a cooperative communication in a wireless network. The present disclosure provides a solution to the existing problem of an inefficient power management of the network nodes resulting in a high operating cost in wireless networks (e.g., cellular networks). An aim of the present disclosure is to provide a solution that overcomes at least partially the problems encountered in the prior art, provides improved network nodes (i.e., a receiving network node, a transmitting network node, and a central communication device) and improved methods, and exploits an idle network node (e.g., an idle base station) for power-efficient cooperative communication in a wireless network (e.g., cellular networks), thereby reducing the operating cost in the wireless networks (e.g., the cellular networks).

One or more of the objectives of the present disclosure are achieved by the solutions provided in the enclosed independent claims. Advantageous implementations of the present disclosure are further defined in the dependent claims.

In one aspect, the present disclosure provides a receiving network node, comprising: a first antenna array; one or more radio frequency components; one or more configurable loads; a switch; and a first control circuit. The first antenna array comprises one or more antennas arranged to be selectably coupled, via the switch, to the one or more radio frequency components or the one or more configurable loads. The first control circuit is configured to obtain instruction data for configuring the first antenna array from a transmit-receive mode to a scattering mode. The first control circuit, based on the instruction data, is further configured to configure the one or more configurable loads to scatter, by the configured first antenna array, a first beam of a radio frequency signal sent by a transmitting network node located in a first cell, to a first user device located in a second cell. The first control circuit is further configured to control the switch to change a coupling of the one or more antennas from the one or more radio frequency components to the configured one or more configurable loads, and set the one or more radio frequency components to an idle mode.

The receiving network node of the present disclosure enables power-efficient cooperative communication in a wireless network (e.g., cellular networks) without any compromise in quality-of-service (QoS), thereby reducing the operating cost of such wireless networks. The cooperative communication, for example, between the transmitting network node (e.g., active network node or an active base station) and the receiving network node (e.g., an idle network node or an idle base station) effectively reduces the energy consumption in the low-traffic phases (or under-load periods). As the first antenna array is configured from the transmit-receive mode to the scattering mode dynamically, the energy consumption in the low-traffic phases (or under-load periods) is substantially reduced. Moreover, as a result of the scattering of the first beam of the radio frequency signal sent by the transmitting network node by the configured first antenna array, the coverage of the transmitting network node is increased without any increase, or with an almost negligible increase, in the transmission power of the transmitting network node, neighbouring network nodes (e.g., the receiving network node), and user devices in the cellular network. Furthermore, this solution enhances a signal level for the links between the transmitting network node (e.g., an active base-station) located in the first cell and the first user device located in the second cell of the receiving network node (e.g., cells of idle base stations).

In an implementation form, the first control circuit is further configured to release a radio resource control connection with the first user device.

The release of the radio resource control connection with the first user device by the receiving network node facilitates an attachment of the first user device to the transmitting network node.

In a further implementation form, the receiving network node further comprises a second antenna array, and the first control circuit is further configured to set the second antenna array in a transmit-receive mode, and communicate, concurrently to the scattering of the first beam of the radio frequency signal to the first user device, a second beam of a radio frequency signal to a second user device via the second antenna array.

The receiving network node is capable of concurrently scattering the first beam to the first user device in a controlled low-power state in the scattering mode as well as to transmit the second beam to serve a limited number of users, such as the second user device, in its cell.

In a further implementation form, the first antenna array is configured to perform a radio frequency communication in the transmit-receive mode and the scattering mode.

The receiving network node improves network performance and provides flexibility in operations of the receiving network node and the overall network by virtue of the dual-function antenna array. The dynamic configuration of the one or more configurable loads based on the obtained instruction data enables the same antenna panel, such as the first antenna array, to function as the dual-function antenna array employed for both communication (in the transmit-receive mode) and scattering (in the scattering mode).

In a further implementation form, the receiving network node further comprises a dedicated scattering array collocated with the first antenna array.

The dedicated scattering array may act as a separate array that is collocated with the first antenna array (e.g., a communication antenna array in this implementation form) to enable both communication in the transmit-receive mode and scattering by the dedicated scattering array.

In a further implementation form, the first control circuit is further configured to communicate with a central unit or the transmitting network node to obtain the instruction data.

The receiving network node is configured to obtain the instruction data either from a central unit (e.g., a cloud network management server) or the transmitting network node, which enables to configure the first antenna array from the transmit-receive mode to the scattering mode to effectively reduce the energy consumption in the low-traffic phases (or under-load periods).

In a further implementation form, the receiving network node is at least one of a cellular base station, and a user device.

The receiving network node is potentially a cellular base station, such as an idle base station, which is exploited (i.e., used) to execute power-efficient cooperative communication in the cellular networks. In another case, the receiving network node is potentially a user device, such as a user equipment.

In another aspect, the present disclosure provides a transmitting network node, comprising: a third antenna array; and a second control circuit, configured to select one or more antennas of the third antenna array to send a first beam of a radio frequency signal to a receiving network node. The second control circuit is further configured to provide to the receiving network node instruction data for configuring a first antenna array of the receiving network node from a transmit-receive mode to a scattering mode. The first antenna array, based on the instruction data, is configured to scatter the first beam of the radio frequency signal to a first user device.

The transmitting network node of the present disclosure in cooperation with the receiving network node enables a power-efficient cooperative communication without any compromise in quality-of-service (QoS). Moreover, as a result of the scattering of the first beam of the radio frequency signal sent by the transmitting network node, the coverage of the transmitting network node is increased without any increase, or with an almost negligible increase, in the transmission power of the transmitting network node, neighbouring network nodes (e.g., the receiving network node), and the first user device in the cellular network. Furthermore, a signal level for the links between the transmitting network node (e.g., an active base-station) located in the first cell and the first user device located in the second cell of the receiving network node (e.g., cell of idle base station) is substantially enhanced. Moreover, the first antenna array is configured from the transmit-receive mode to the scattering mode dynamically, which in turn enables the power-efficient cooperative communication where overall energy consumption in the low-traffic phases (or under-load periods) of a network is substantially reduced.

In a further implementation form, the instruction data provided to the receiving network node comprises at least one of: selection data for the first antenna array of the receiving network node to select which of one or more antennas of the first antenna array to couple to a configurable load; configuration data to configure the configurable load; and timing data to define a duration of time during which the first antenna array is set to maintain the scattering mode.

Beneficially, the one or more antennas of the first antenna array are connected to an extremely low-power array of loads (i.e., the configurable load), which enables to control a scattering behavior of the one or more antennas of the first antenna array for the defined duration.

In a further implementation form, the second control circuit is further configured to execute a channel sounding operation to determine if the first user device is detectable within the second cell.

The transmitting network node is located in the first cell and the detection of the first user device within the second cell enables to determine users (e.g., the first user device) that can be adequately served with the scattering via the second network node.

In a further implementation form, the second control circuit is further configured to: establish a radio resource control connection with the first user device; disconnect the first user device from the receiving network node; and attach the first user device to the transmitting network node for the first user device to receive the first beam of the radio frequency signal scattered via the first antenna array.

The transmitting network node that is located in the first cell is able to form a link with the first user device within the second cell using the scattering capability of the first antenna array of the receiving network node (e.g., by using the idle base-station).

In a further implementation form, the second control circuit is further configured to select a beamforming scheme from a plurality of beamforming schemes to transmit the first beam of the radio frequency signal to the receiving network node. The transmitted first beam of the radio frequency signal is scattered by at least one of: the first antenna array configured in the scattering mode, and a dedicated scattering array of the receiving network node.

The selection of the suitable beamforming scheme further ensures that the signal level for the links between the transmitting network node (e.g., an active base station) located in the first cell and the first user device located in the second cell of the receiving network node (e.g., cell of idle base station) is effectively enhanced.

In a further implementation form, the selected beamforming scheme comprises a combination of a direct link between the transmitting network node and a second user device, and a scattered link between the transmitting network node and the first user device via the first antenna array of the receiving network node.

The transmitting network node (e.g., an active base station) leverages a dual-path channel composed of the direct link (which can be line of sight or non-line of sight), plus a scattered path (i.e., the scattered link), which leverages the first antenna array of a neighboring second network node (e.g., the idle base station) placed in controlled scattering mode.

In a further implementation form, the transmitting network node is at least one of a cellular base station and a user device.

The transmitting network node is potentially a cellular base station, such as an active base station, which uses a neighboring second network node (e.g., an idle base station) placed in controlled scattering mode, in order to execute power-efficient cooperative communication in the cellular networks. In another case, the transmitting network node is potentially a user device, such as a user equipment.

In yet another aspect, the present disclosure provides a central communication device, comprising a third control circuit configured to monitor wireless traffic load information associated with a plurality of radio resource units in a wireless network. The third control circuit is further configured to send instruction data to a receiving network node based on the monitored wireless traffic load information, the instruction data being configured to switch a first antenna array of a radio resource unit of the receiving network node from a transmit-receive mode to a scattering mode. The third control circuit is further configured to control a transmitting network node located in a first cell to provide a first beam of a radio frequency signal to a first user device located in a second cell via the first antenna array configured in the scattering mode or a dedicated scattering array collocated with the first antenna array of the receiving network node.

The central communication device of the present disclosure enables a power-efficient cooperative communication between the transmitting network node and the receiving network node without any compromise in the QoS. Based on the monitored wireless traffic load information, the central communication device identifies that the receiving network node is in idle mode (or will be in idle mode). Thus, to serve the limited users of the receiving network node, the instruction data is sent to enable the first antenna array to be configured from the transmit-receive mode to the scattering mode to effectively reduce the overall energy consumption in the low-traffic phases (or under-load periods) in a wireless network (e.g., a cellular network).

In a further implementation form, the third control circuit is further configured to determine, based on the monitored wireless traffic load information, one or more first radio resource units of the transmitting network node located in a first cell that are to remain active for a time period, and one or more second radio resource units of the receiving network node located in a second cell that are to be idle for the time period.

The accurate identification of which one or more radio resource units of different network nodes are to remain active or idle, enables to effectively implement the power-efficient cooperative communication in real time or near-real time between an active transmitting network node and an idle receiving network node.

In a further implementation form, the scattering mode is a mode, in which one or more radio frequency components associated with the first antenna array of the receiving network node are in an idle mode and a scattering characteristic of the first antenna array or the dedicated scattering array is in a controlled power state to deflect the first beam of the radio frequency signal to the first user device.

The scattering mode is a new mode that further increases power-efficiency in the cooperative communication without any compromise in quality-of-service (QoS). The controlled power state is a an extremely low-power state that is substantially less than a power state of the transmit-receive mode.

In yet another aspect, the present disclosure provides a method for executing a cooperative communication in a wireless network, the method comprising obtaining, by a receiving network node, instruction data for configuring a first antenna array of a radio resource unit of the receiving network node. The method further comprises configuring, by the receiving network node, the first antenna array of the radio resource unit from a transmit-receive mode to a scattering mode; and scattering, by the configured first antenna array, a first beam of a radio frequency signal sent by a transmitting network node located in a first cell, to a first user device located in a second cell.

The method executed by the receiving network node achieves all the advantages and effects of the receiving network node of the present disclosure.

In an implementation form, the configuring the first antenna array of the radio resource unit from a transmit-receive mode to a scattering mode comprises: releasing, by the receiving network node, a radio resource control connection with the first user device; setting one or more radio frequency components of the radio resource unit of the receiving network node to an idle mode; and controlling a scattering characteristic of the first antenna array by switching a coupling of one or more antennas of the first antenna array from the one or more radio frequency components to one or more configurable loads of the receiving network node.

As the first antenna array is configured from the transmit-receive mode to the scattering mode dynamically, the energy consumption in the low-traffic phases (or under-load periods) in the cellular network is substantially reduced as compared to conventional methods.

In another aspect, the present disclosure provides a method for executing a cooperative communication in a wireless network, the method comprising: providing instruction data for configuring a first antenna array of a radio resource unit of a receiving network node from a transmit-receive mode to a scattering mode; and, based on the instruction data, configuring an antenna array of a transmitting network node to direct a first beam of a radio frequency signal towards the first antenna array. The first beam of the radio frequency signal is scattered to a first user device by the first antenna array.

The method executed by the transmitting network node achieves all the advantages and effects of the transmitting network node of the present disclosure.

In another aspect, the present disclosure provides a method for executing a cooperative communication in a wireless network, the method comprising: monitoring, by a central communication device, wireless traffic load information associated with a plurality of radio resource units in the wireless network; sending, by the central communication device, instruction data to a receiving network node, based on the monitored wireless traffic load information, the instruction data being instructions to configure a first antenna array of a radio resource unit of the receiving network node from a transmit-receive mode to a scattering mode; and controlling, by the central communication device, a transmitting network node located in a first cell to provide a first beam of a radio frequency signal to a first user device located in a second cell via the first antenna array configured in the scattering mode or a dedicated scattering array collocated with the first antenna array.

The method executed by the central communication device achieves all the advantages and effects of the central communication device of the present disclosure.

In yet another aspect, the present disclosure provides a computer program product comprising a non-transitory computer-readable storage medium having computer-readable instructions stored thereon, the computer-readable instructions being executable by a processor of a communication device to execute a method of aforementioned aspects.

The computer program product achieves all the advantages and effects of the respective methods of the present disclosure.

It has to be noted that all devices, elements, circuitry, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof. It will be appreciated that features of the present disclosure are susceptible to being combined in various combinations without departing from the scope of the present disclosure as defined by the appended claims.

Additional aspects, advantages, features and objects of the present disclosure will be apparent from the drawings and the detailed description of the illustrative implementations construed in conjunction with the appended claims that follow.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

Figure 1A:
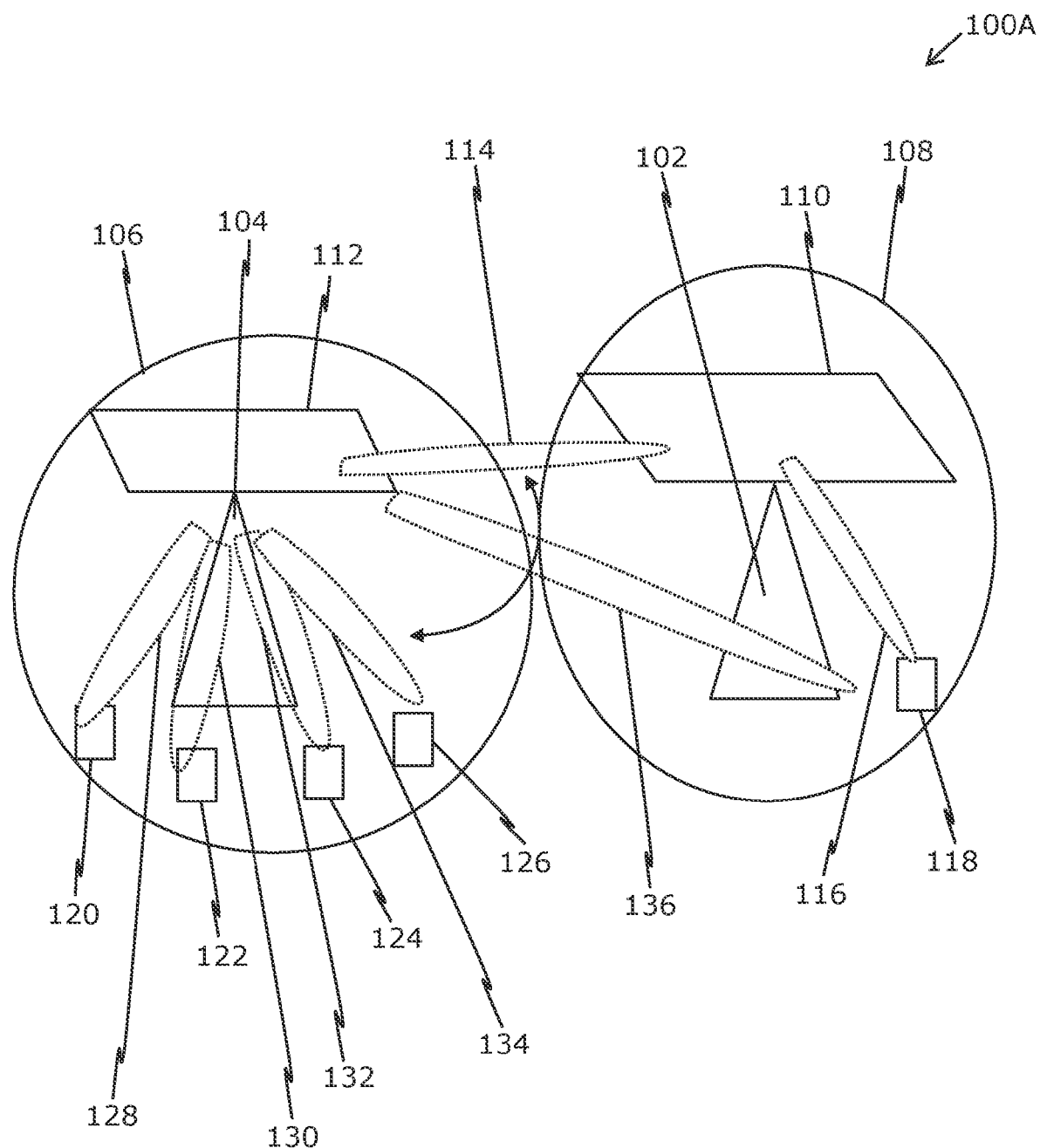
FIG. 1A is a network environment diagram of a system with a receiving network node and a transmitting network node for executing a cooperative communication, in accordance with an embodiment of the present disclosure.

FIG. 1A is a network environment diagram of a system with a receiving network node and a transmitting network node for executing a cooperative communication, in accordance with an embodiment of the present disclosure. With reference to FIG. 1A, a network environment of a system 100A includes a receiving network node 102 and a transmitting network node 104. The transmitting network node 104 is located within a first cell 106 and the receiving network node 102 is located within a second cell 108. The receiving network node 102 includes one or more antenna arrays, such as a first antenna array 110. In some embodiments, the receiving network node 102 includes a second antenna array (not shown). The transmitting network node 104 includes one or more antenna arrays, such as a third antenna array 112. There is further shown a first beam 114 communicated by the transmitting network node 104 towards the receiving network node 102. The first beam 114 is scattered by the first antenna array 110 as a scattered beam 116 directed towards a first user device 118. In this case, the first user device 118 is within the second cell 108, and a plurality of other user devices, such as user devices 120 to 126, are located within the first cell 106. There is also shown a plurality of beams, such as beams 128 to 136, which are emanated from the transmitting network node 104.

The receiving network node 102 include suitable logic, circuitry, interfaces, and/or code that is configured to obtain instruction data for configuring the first antenna array 110 from a transmit-receive mode to a scattering mode. The instruction data is used by the receiving network node 102 to configure the first antenna array 110 from the transmit-receive mode to the scattering mode. The transmit-receive mode refers to a usual mode of transmission and reception of radio frequency signals. In the transmit-receive mode, the first antenna array 110 potentially continuously transmits and receives radio frequency signals and, hence, remains active all the time and in turn consumes more power. The scattering mode is a new mode of operation, where radio frequency components associated with the first antenna array 110 of the receiving network node 102 are in an idle mode and a scattering characteristic of the first antenna array 110 is in a controlled low-power state to deflect a given beam (e.g., the first beam 114) of a radio frequency signal to a given user device (e.g., the first user device 118). The scattering mode is potentially used to serve a few user devices. In this mode, the first antenna array 110 consumes significantly less power while serving the user devices. Examples of the receiving network node 102 include, but are not limited to a base station, a receiver, a repeater device, an Internet-of-Things (IoT) controller, a user device, a customized hardware for wireless telecommunication, or any other portable or non-portable communication device or system.

The transmitting network node 104 include suitable logic, circuitry, interfaces, and/or code that is configured to send the first beam 114 of a radio frequency signal to the receiving network node 102. In an implementation, the transmitting network node 104 may be referred as an active base station which actively transmits and receives radio frequency signals in the wireless network. In another implementation, the first cell 106 in which the transmitting network node 104 is located may also be referred as a normally loaded cell or an overloaded cell. Examples of the transmitting network node 104 include, but are not limited to a base station, a server, a transmitter, an Internet-of-Things (IoT) controller, a user device, a customized hardware for wireless telecommunication, or any other portable or non-portable communication device.

The first cell 106 generally refers to a geographical region within which the transmitting network node 104 provides a radio coverage to each of the plurality of user devices (such as the user devices 120 to 126). Similarly, the second cell 108 is potentially a geographical region within which the receiving network node 102 (e.g., an idle base station) provides a radio coverage to its users, such as the first user device 118.

The first antenna array 110 include suitable logic, circuitry, interfaces, and/or code that is configured to scatter the first beam 114 of radio frequency signal sent by the transmitting network node 104 located in the first cell 106, to the first user device 118 located in the second cell 108. In an implementation, the first antenna array 110 is configured from the transmit-receive mode to the scattering mode. Examples of the first antenna array 110 may include, but are not limited to, an antenna panel, a network interface, a telematics unit, or any other antenna array suitable for use in the receiving network node 102. The first antenna array 110 supports various wireless (e.g., cellular) communication protocols to execute wireless communication.

The first user device 118 includes suitable logic, circuitry, interfaces, and/or code that is configured to receive the first beam 114 communicated by the transmitting network node 104 as the scattered beam 116 (the first beam 114 is scattered by the first antenna array 110 referred to as the scattered beam 116). Examples of the first user device 118 include, but are not limited to a smart phone, a laptop computer, a wireless headphone, a personal digital assistant (PDA), an Internet-of-Things (IoT) device, a machine type communication (MTC) device, a computing device, an evolved universal mobile telecommunications system (UMTS) terrestrial radio access (E-UTRAN) NR-dual connectivity (EN-DC) device, a drone, a customized hardware for wireless telecommunication, a transmitter, a receiver, or any other portable or non-portable electronic device.

The third antenna array 112 includes suitable logic, circuitry, interfaces, and/or code that is configured to send the first beam 114 of a radio frequency signal to the receiving network node 102. Additionally, the third antenna array 112 performs a radio frequency communication in the transmit-receive mode. In an implementation, the third antenna array 112 is configured to communicate with each of the plurality of user devices, such as the user devices 120 to 126, via the plurality of beams, such as the beams 128 to 134), respectively. Examples of the third antenna array 112 may include, but are not limited to, an antenna panel, a radio frequency transceiver, a network interface, a telematics unit, or any other antenna array suitable for use in the transmitting network node 104, or other portable or non-portable communication devices. The third antenna array 112 supports various wireless and cellular communication protocols to execute wireless communication.

Each of the plurality of user devices (i.e., the user devices 120, to 126) includes suitable logic, circuitry, interfaces, and/or code that is configured to communicate with the transmitting network node 104 within the first cell 106. The first beam 114 may also be referred to as a quasi-static beam or a quasi-static beamformed link.

In operation, the receiving network node 102 is configured to obtain instruction data for configuring the first antenna array 110 from the transmit-receive mode to the scattering mode based on instruction data. In an implementation, the instruction data is obtained from the transmitting network node 104. In another implementation, the instruction data is obtained from a central communication device. The central communication device is described in detail, for example, in FIGS. 2A and 2B. Thereafter, the receiving network node 102 configures the first antenna array 110 of a radio resource unit from the transmit-receive mode to the scattering mode. The transmitting network node 104 configures its antenna array (e.g., the third antenna array 112) to direct the first beam 114 of the radio frequency signal towards the first antenna array 110. The configured first antenna array 110 of the receiving network node 102 is further configured to scatter the first beam 114 of a radio frequency signal sent by the transmitting network node 104 located in the first cell 106 to the first user device 118 located in the second cell 108. In an example, the second cell 108, in which the receiving network node 102 (e.g., an idle base station) is located, is an underloaded cell. The first beam of the radio frequency signal is scattered to the first user device 118 by the first antenna array 110 using the provided instruction data.

Figure 1B:
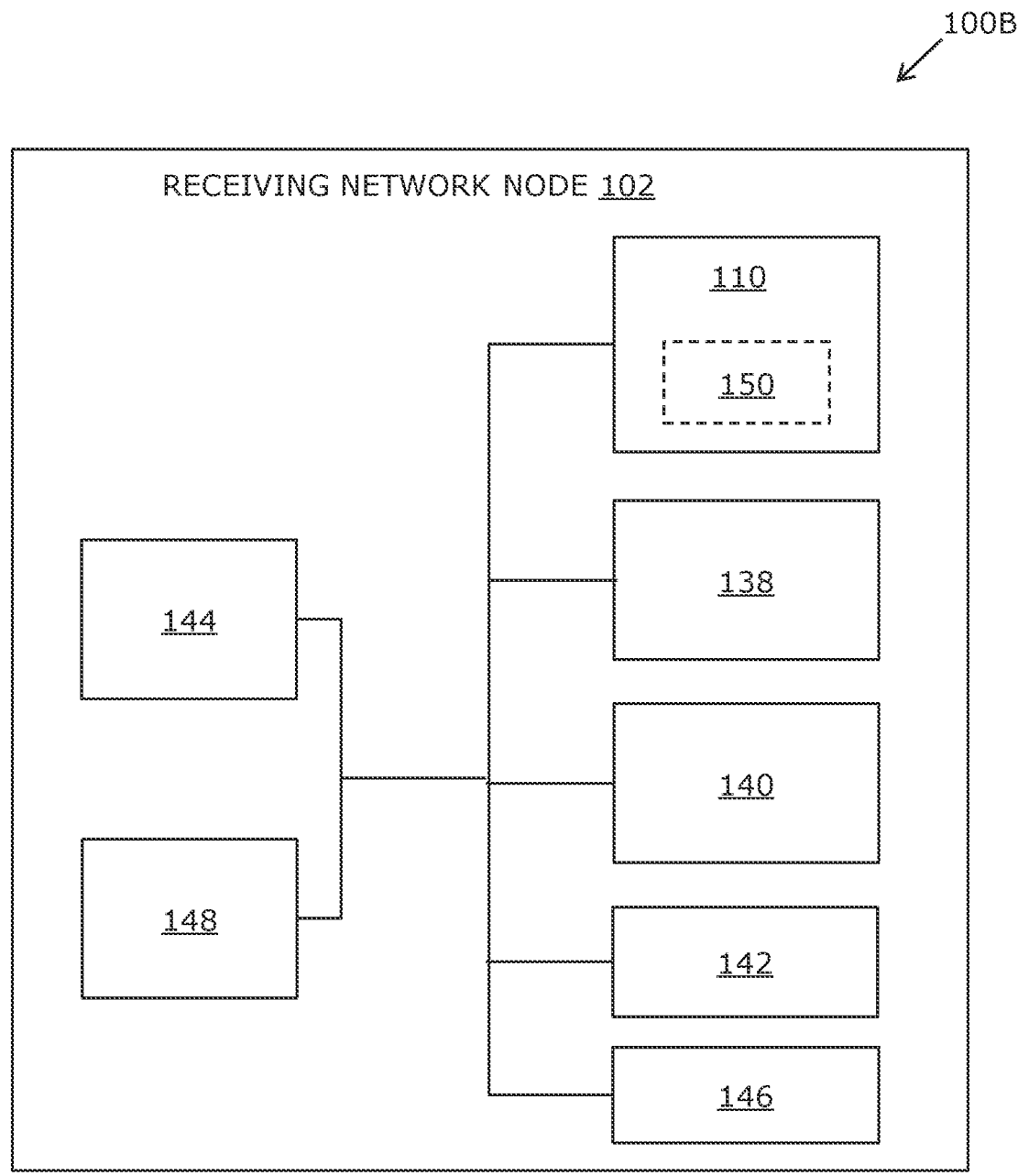
FIG. 1B is a block diagram that illustrates various exemplary components of a receiving network node, in accordance with an embodiment of the present disclosure.

FIG. 1B is a block diagram that illustrates various exemplary components of a receiving network node, in accordance with an embodiment of the present disclosure. FIG. 1B is described in conjunction with elements from FIG. 1A. With reference to FIG. 1B, there is shown a block diagram 100B of the receiving network node 102. The receiving network node 102 includes one or more antenna arrays, such as the first antenna array 110 and a second antenna array 138. The receiving network node 102 further includes one or more radio frequency components 140, one or more configurable loads 142, a first control circuit 144, a switch 146, and a memory 148. In an implementation, the receiving network node 102 comprises a dedicated scattering array 150 that is collocated with the first antenna array 110.

The first antenna array 110, the second antenna array 138, the one or more radio frequency components 140 and the one or more configurable loads 142, and the memory 148 are communicatively coupled to the first control circuit 144. In an implementation, the first antenna array 110, the one or more radio frequency components 140, the one or more configurable loads 142 and the switch 146 may be a part of a radio resource unit (which is described in detail, for example, in FIGS. 2A and 2B). In such an implementation, the second antenna array 138 may be provided in another radio resource unit.

The first antenna array 110 comprises one or more antennas which are arranged to be selectably coupled, via the switch 146, to the one or more radio frequency components 140 or the one or more configurable loads 142. The coupling of the one or more antennas of the first antenna array 110 to the one or more radio frequency components 140 or to the one or more configurable loads 142 is described in detail, for example, in FIGS. 1C and 1D.

The second antenna array 138 includes suitable logic, circuitry, interfaces, and/or code that is configured to communicate a second beam of a radio frequency signal to a second user device within the second cell 108. The second antenna array 138 is set in the transmit-receive mode. The communication of the second beam of the radio frequency signal to the second user device via the second antenna array 138, concurrently to the scattering of the first beam 114 of the radio frequency signal by the first antenna array 110 to the first user device 118, is described in detail, for example, in FIG. 2A.

The one or more radio frequency components 140 include suitable logic, circuitry, interfaces, and/or code that are configured in the transmit-receive mode. The one or more radio frequency components 140 correspond to a radio chain (e.g., components of a transceiver chain, for example, mixers, amplifiers, phase shifters, and the like) and are responsible for processing of radio frequency signals associated with transmission or reception of such signals.

The one or more configurable loads 142 include suitable logic, circuitry, interfaces, and/or code that is configured based on the obtained instruction data to scatter, by the configured first antenna array 110, the first beam 114 of the radio frequency signal sent by the transmitting network node 104 located in the first cell 106 to the first user device 118 located in the second cell 108. An exemplary implementation for the configuration of the one or more configurable loads is described in detail, for example, in FIGS. 3A, 3B, and 3C.

The first control circuit 144 includes suitable logic, circuitry, interfaces, and/or code that is configured to obtain instruction data for configuring the first antenna array 110 from the transmit-receive mode to the scattering mode. The first control circuit 144 is further configured to execute instructions stored in the memory 148. Examples of the first control circuit 144 may include, but are not limited to an integrated circuit, a digital signal processor (DSP), a general purpose processor, a co-processor, a microprocessor, a microcontroller, a complex instruction set computing (CISC) processor, an application-specific integrated circuit (ASIC) processor, a reduced instruction set (RISC) processor, a very long instruction word (VLIW) processor, a central processing unit (CPU), a state machine, a data processing unit, and other processors or circuits. Moreover, the first control circuit 144 may refer to one or more individual processors, processing devices, a processing unit that is part of a machine.

The switch 146 includes suitable logic, circuitry, interfaces, and/or code that is configured to change a coupling of the one or more antennas of the first antenna array 110 from the one or more radio frequency components 140 to the one or more configured loads 142.

The memory 148 may include suitable logic, circuitry, and/or interfaces that is configured to store machine code and/or instructions executable by the first control circuit 144 (e.g., a processor). Examples of implementation of the memory 148 may include, but are not limited to, Electrically Erasable Programmable Read-Only Memory (EEPROM), Random Access Memory (RAM), Read Only Memory (ROM), Hard Disk Drive (HDD), Flash memory, a Secure Digital (SD) card, Solid-State Drive (SSD), a computer readable storage medium, and/or CPU cache memory. The memory 148 may store an operating system and/or a computer program product to operate the receiving network node 102. A computer readable storage medium for providing a non-transient memory may include, but is not limited to, an electronic storage device, a magnetic storage device, an optical storage device, an electromagnetic storage device, a semiconductor storage device, or any suitable combination of the foregoing.

In operation, the first control circuit 144 is configured to obtain instruction data for configuring the first antenna array 110 from a transmit-receive mode to a scattering mode. The obtained instruction data is used by the first control circuit 144 in order to configure the first antenna array 110 (e.g., one or more antennas of the first antenna array 110) from the transmit-receive mode to the scattering mode. For example, the obtained instruction data may specify information (instructions) sufficient to select antennas, and configure such selected antennas of the first antenna array 110 to the scattering mode.

Based on the obtained instruction data, the first control circuit 144 is further configured to configure the one or more configurable loads 142 to scatter, by the configured first antenna array 110, the first beam 114 of a radio frequency signal sent by the transmitting network node 104 located in the first cell 106, to the first user device 118 located in the second cell 108. The first antenna array 110 (specifically one or more selected antennas of the first antenna array 110) is switched to the one or more configurable loads 142 in the scattering mode to scatter the first beam 114 of the radio frequency signal to the first user device 118 located in the second cell 108.

The first control circuit 144 is further configured to control the switch 146 to change a coupling of the one or more antennas from the one or more radio frequency components 140 to the configured one or more configured loads 142. The coupling of the one or more antennas to the one or more configured loads 142 from the radio frequency components 140 indicates the switching of the one or more antennas from the transmit-receive mode to the scattering mode.

The first control circuit 144 is further configured to set the one or more radio frequency components 140 to an idle mode. In order to reduce the energy consumption of the receiving network node 102 in low traffic phases (or under load periods), the one or more radio frequency components 140 are set to the idle mode by the first control circuit 144.

In accordance with an embodiment, the first control circuit 144 is further configured to release a radio resource control connection with the first user device 118. Typically, one of the primary functions of the radio resource control (RRC) protocol include connection establishment and release functions. The first user device 118 is first attached to the receiving network node 102 via a radio resource control connection (RRC) connection. The radio resource control connection with the first user device 118 is released when the instruction data is obtained by the receiving network node 102. Once the radio resource control connection with the first user device 118 is released, it becomes available to be attached to the transmitting network node 104. In other words, the release the radio resource control connection with the first user device 118 by the receiving network node 102 facilitates an attachment of the first user device 118 to the transmitting network node 104.

In accordance with an embodiment, the receiving network node 102 further comprises the second antenna array 138, wherein the first control circuit 144 is further configured to set the second antenna array 138 in the transmit-receive mode and communicate, concurrently to the scattering of the first beam 114 of the radio frequency signal to the first user device 118, the second beam of the radio frequency signal to the second user device via the second antenna array 138. The second antenna array 138 communicates the second beam of the radio frequency signal to the second user device (e.g., another user device with the second cell 108) concurrently to the scattering of the first beam 114 of the radio frequency signal to the first user device 118 by the first antenna array 110.

In accordance with an embodiment, the first antenna array 110 is configured to perform a radio frequency communication in the transmit-receive mode and the scattering mode. The first antenna array 110 includes the one or more antennas which can be coupled either to the one or more radio frequency components 140 to perform the radio frequency communication in the transmit-receive mode or to the one or more configurable loads 142 to perform the radio frequency communication in the scattering mode. In this way, the same antenna array (e.g., the first antenna array 110) (and its antennas) is used for radio frequency communication as well as scattering.

In accordance with an embodiment, the receiving network node 102 further comprises the dedicated scattering array 150 collocated with the first antenna array 110. The dedicated scattering array 150 potentially performs the radio frequency communication exclusively in the scattering mode. In an implementation, the dedicated scattering array 150 may employ one or more antennas to perform scattering. In another implementation, the dedicated scattering array 150 may employ meta-materials, for example, liquid crystal display (LCD) or plasmonic cells. The dedicated scattering array 150 may also be referred to as a separate array that is used for scattering and is collocated with the first antenna array 110. For example, an antenna of the dedicated scattering array 150 may be juxtaposed (or arranged side-by-side) with an antenna of the first antenna array 110 in a collocated form. Thus, a given physical array (such as the first antenna array 110) potentially have a mix of antennas, a set of which are dedicated for scattering and another set of which are configured for usual radio frequency communication.

In accordance with an embodiment, the first control circuit 144 is configured to be in communication with a central unit or the transmitting network node 104 to obtain the instruction data. The central unit (i.e., a central communication device) continuously monitors wireless traffic load associated with the transmitting network node 104 and the receiving network node 102 as well. Based on the monitoring of the wireless traffic load information, the central unit (or central communication device) communicates the instruction data to the first control circuit 144 of the receiving network node 102. The central unit (or central communication device) is described in detail, for example, in FIG. 2B. The transmitting network node 104 may also communicate the instruction data to the first control circuit 144 because the transmitting network node 104 is a neighboring base station of the receiving network node 102. For example, in a cellular network, such as in new radio (NR) or long-term evolution (LTE) cellular network, the neighboring base stations (e.g., the transmitting network node 104 and the receiving network node 102) can exchange the traffic load information by use of a dedicated interface. The obtained the instruction data enables to configure the first antenna array 110 from the transmit-receive mode to the scattering mode to effectively reduce the energy consumption in the low traffic phases (or under load-periods).

In accordance with an embodiment, the receiving network node 102 is at least one of a cellular base station and a user device. In a cellular network, such as in new radio (NR) or long-term evolution (LTE) cellular network, the receiving network node 102 acts as the cellular base station. The receiving network node 102 is potentially a cellular base station, such as an idle base station, which is exploited (i.e., used) to execute power-efficient cooperative communication in the cellular network. In another case, the receiving network node 102 is potentially a user device, such as a user equipment (UE).

Figure 1C:
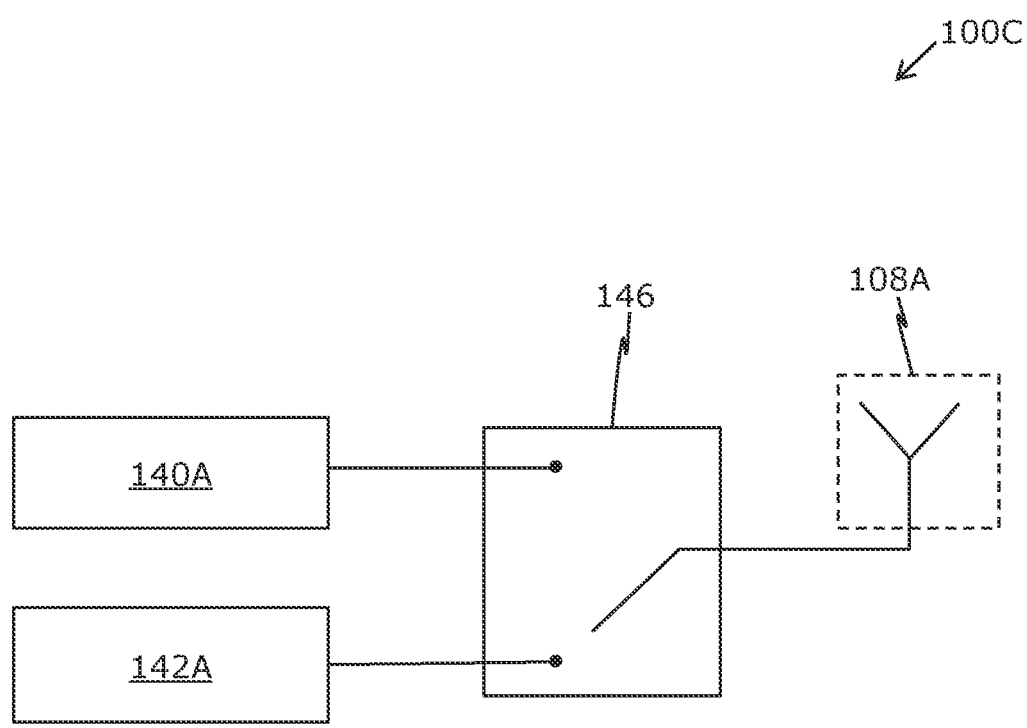
FIG. 1C is a circuit diagram of reconfiguration of an antenna between a transmit-receive mode and a scattering mode, in accordance with an embodiment of the present disclosure.

FIG. 1C is a circuit diagram of reconfiguration of an antenna between a transmit-receive mode and a scattering mode, in accordance with an embodiment of the present disclosure. FIG. 1C is described in conjunction with elements from FIGS. 1A and 1B. With reference to FIG. 1C, there is shown a circuit architecture 100C of reconfiguration of a first antenna 108A of the first antenna array 110 between the transmit-receive mode and the scattering mode by use of the switch 146. In the circuit architecture 100C, there is further shown a first radio frequency component 140A of the one or more radio frequency components 140 and a first configurable load 142A of the one or more configurable loads 142.

The first antenna array 110 of the receiving network node 102 can be used for radio frequency communication as well as for the scattering for extremely low-power communication. In this embodiment, the first antenna 108A of the first antenna array 110 can be configured to be connected either to the first radio frequency component 140A or to the first configurable load 142A by use of the switch 146. The first antenna 108A perform radio frequency communication in the transmit-receive mode when connected to the first radio frequency component 140A. Similarly, the first antenna 108A perform scattering in the scattering mode when connected to the first configurable load 142A by use of the switch 146.

Figure 1D:
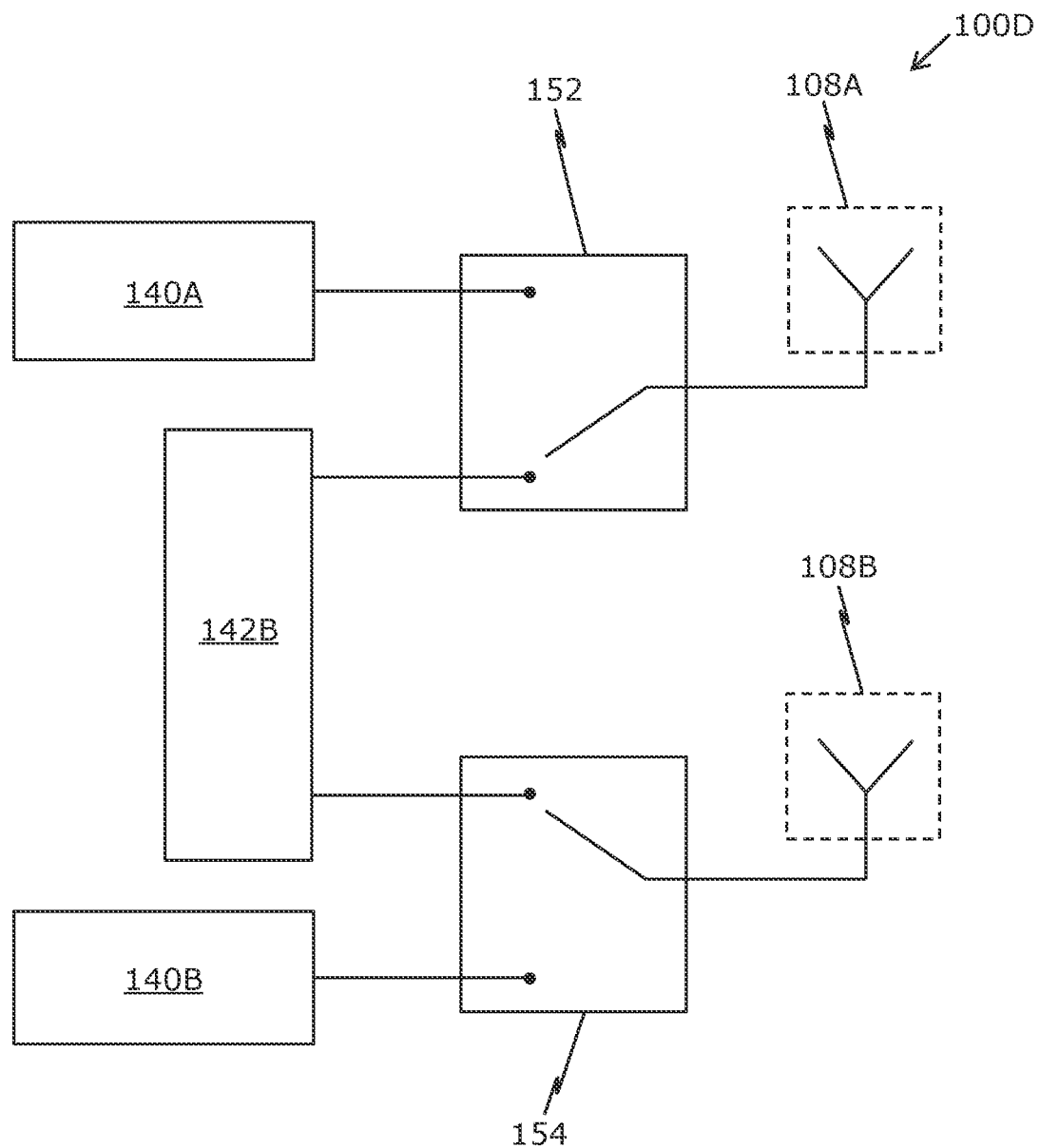
FIG. 1D is a circuit diagram of reconfiguration of a pair of antennas between a transmit-receive mode and a scattering mode, in accordance with an embodiment of the present disclosure.

FIG. 1D is a circuit diagram of reconfiguration of a pair of antennas between a transmit-receive mode and a scattering mode, in accordance with an embodiment of the present disclosure. FIG. 1D is described in conjunction with elements from FIGS. 1A, 1B, and 1C. With reference to FIG. 1D, there is shown a circuit architecture 100D that depicts reconfiguration of a pair of antennas between the transmit-receive mode and the scattering mode. In the circuit architecture 100D, there is further shown a second antenna 108B of the first antenna array 110, a first switch 152, a second switch 154, a second radio frequency (RF) component 140B of the one or more radio frequency components 140. Each of the first switch 152 and the second switch 154 correspond to the switch 146 of FIG. 1B.

In this embodiment, the first antenna 108A and the second antenna 108B of the first antenna array 110, are both configured to a network of loads 142B through the first switch 152 and the second switch 154, respectively, and, therefore, perform scattering in the scattering mode. The network of loads 142B refers to a plurality of loads (or configurable loads) that are networked and not a single load. However, the first antenna 108A and the second antenna 108B can also perform radio frequency communication in the transmit-receive mode when configured to the first radio frequency component 140A and to the second radio frequency component 140B through the first switch 152 and the second switch 154.

Figure 1E:
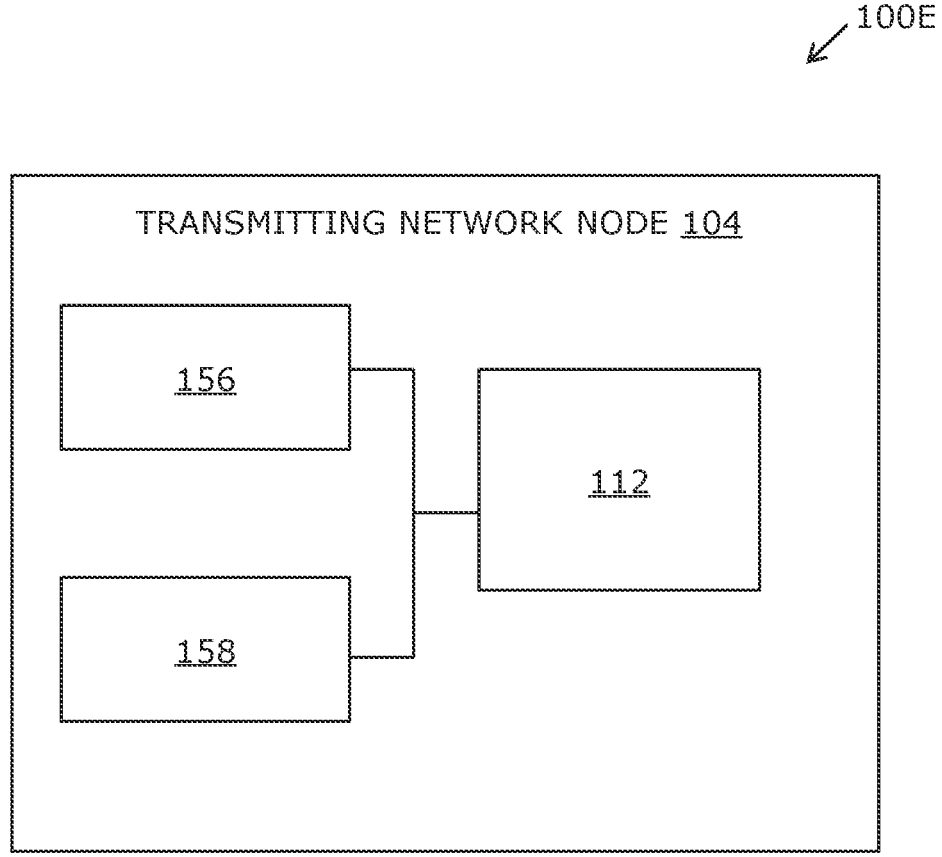
FIG. 1E is a block diagram that illustrates various exemplary components of a transmitting network node, in accordance with an embodiment of the present disclosure.

FIG. 1E is a block diagram that illustrates various exemplary components of a transmitting network node, in accordance with an embodiment of the present disclosure. FIG. 1E is described in conjunction with elements from FIGS. 1A, 1B, 1C, and 1D. With reference to FIG. 1E, there is shown a block diagram 100E of the transmitting network node 104. The transmitting network node 104 includes a second control circuit 156 and a memory 158. There is further shown the third antenna array 112. The third antenna array 112 is communicatively coupled to the second control circuit 156 and the memory 158. In an implementation, the third antenna array 112 may be a part of a radio resource unit (which is described in detail, for example, in FIGS. 2A and 2B). The third antenna array 112 includes one or more antennas.

The second control circuit 156 includes suitable logic, circuitry, interfaces, and/or code that is configured to select the one or more antennas of the third antenna array 112 to send the first beam 114 of the radio frequency signal to the receiving network node 102. The first beam 114 of the radio frequency signal is scattered by the first antenna array 110 of the receiving network node 102 to provide the first beam 114 of the radio frequency signal to the first user device 118 when the receiving network node 102 in use. The second control circuit 156 is further configured to execute instructions stored in the memory 158. Examples of the second control circuit 156 may include, but are not limited to an integrated circuit, a co-processor, a microprocessor, a microcontroller, a complex instruction set computing (CISC) processor, an application-specific integrated circuit (ASIC) processor, a reduced instruction set (RISC) processor, a very long instruction word (VLIW) processor, a central processing unit (CPU), a state machine, a data processing unit, and other processors or circuits. Moreover, the second control circuit 156 may refer to one or more individual processors, processing devices, a processing unit that is part of a machine.

The memory 158 may include suitable logic, circuitry, and/or interfaces that is configured to store machine code and/or instructions executable by the second control circuit 156 (e.g., a processor). Examples of implementation of the memory 158 may include, but are not limited to, Electrically Erasable Programmable Read-Only Memory (EEPROM), Random Access Memory (RAM), Read Only Memory (ROM), Hard Disk Drive (HDD), Flash memory, a Secure Digital (SD) card, Solid-State Drive (SSD), a computer readable storage medium, and/or CPU cache memory. The memory 158 may store an operating system and/or a computer program product to operate the transmitting network node 104. A computer-readable storage medium for providing a non-transient memory may include, but is not limited to, an electronic storage device, a magnetic storage device, an optical storage device, an electromagnetic storage device, a semiconductor storage device, or any suitable combination of the foregoing.

In operation, the second control circuit 156 is configured to select one or more antennas of the third antenna array 112 to send the first beam 114 of the radio frequency signal to the receiving network node 102. The second control circuit 156 is further configured to provide to the receiving network node 102 instruction data for configuring the first antenna array 110 of the receiving network node 102 from the transmit-receive mode to the scattering mode, wherein based on the instruction data, the first antenna array 110 is configured to scatter the first beam 114 of the radio frequency signal to the first user device 118. For example, in a case, the receiving network node 102 may be in idle mode or about to become idle and has only a few user devices to serve. In such a case, the instruction data is communicated to the receiving network node 102 for configuring the first antenna array 110 from the transmit-receive mode to the scattering mode to scatter the first beam 114. The one or more antennas of the third antenna array 112 are configured to execute beamforming and send the first beam 114 of the radio frequency signal to the receiving network node 102 which is further scattered to the first user device 118 by use of the first antenna array 110. In this way, the first user device 118 is connected to the transmitting network node 104 through the first antenna array 110 of the receiving network node 102.

In accordance with an embodiment, the instruction data provided to the receiving network node 102 comprises selection data for the first antenna array 110 of the receiving network node 102 to select which of one or more antennas of the first antenna array 110 to couple to a configurable load (i.e., one or more configurable loads). Optionally, the instruction data provided to the receiving network node 102 further comprises configuration data to configure the configurable load 142. Optionally, the instruction data provided to the receiving network node 102 further comprises timing data to define a duration of time during which the first antenna array 110 is set to maintain the scattering mode. The selection data is used to select suitable number of antennas required for scattering. For example, the selected one or more antennas (i.e., antenna elements) of the first antenna array 110 are coupled to one or more configuration loads 142 (e.g., the first configurable load 142A or the network of loads 142B). The configuration data is used in configuring the one or more configuration loads 142 (e.g., the first configurable load 142A or the network of loads 142B). For example, the configuration data includes impedance values of the configurable load (e.g., the first configurable load 142A) for the selected one or more antenna elements of the first antenna array 110. The impedance values are described, for example, in FIG. 3B. The provided instruction data also includes the timing data that is used to set the first antenna array 110 in the scattering mode for a defined duration, for example, until the second cell 108 is under-loaded and the first user device 118 is still to be served.

In accordance with an embodiment, the second control circuit 156 is further configured to execute a channel sounding operation to sense if the first user device 118 is detectable within the second cell 108. The channel sounding operation refers to evaluation of a radio communication channel that is used for wireless communication. A communication channel gets created between the transmitting network node 104 and the first user device 118 because of scattering the first beam 114 of the radio frequency signal to the first user device 118 through the first antenna array 110. The transmitting network node 104 evaluates the communication channel based on detection of the first user device 118 within the second cell 108. In an example, a monitoring beam is potentially used to detect the first user device 118 within the second cell 108. The reflected power from the first user device 118 potentially indicate the distance from the transmitting network node 104. In another example, a precoder corresponding to this beamforming (e.g., the monitoring beam) may be computed either online or offline before the receiving network node 102 (e.g., the idle base station) goes in sleep mode.

In accordance with an embodiment, the second control circuit 156 is further configured to establish a radio resource control connection with the first user device 118. The second control circuit 156 is further configured to disconnect the first user device 118 from the receiving network node 102. The second control circuit 156 is further configured to attach the first user device 118 to the transmitting network node 104 for the first user device 118 to receive the first beam 114 of the radio frequency signal scattered via the first antenna array 110. Establishment of the radio resource control connection with the first user device 118 provides an access to the transmitting network node 104 for radio frequency communications (e.g., data and voice communication). The first user device 118 gets disconnected (released) from the receiving network node 102 and gets attached to the transmitting network node 104 to receive the first beam 114 of the radio frequency signal.

In accordance with an embodiment, the second control circuit 156 is further configured to select a beamforming scheme from a plurality of beamforming schemes to transmit the first beam 114 of the radio frequency signal to the receiving network node 102, wherein the transmitted first beam 114 of the radio frequency signal is scattered by at least one of: the first antenna array 110 configured in the scattering mode, or the dedicated scattering array 150 of the receiving network node 102. The transmitting network node 104 directs the first beam 114 of the radio frequency signal to the first antenna array 110 of the receiving network node 102 by use of the beamforming scheme selected from the plurality of beamforming schemes. The beamforming scheme refers to a signal processing technique in which multiple antennas of a transmitter (e.g., the transmitting network node 104) transmit the same signal in the same direction towards a receiver (e.g., the receiving network node 102). The first beam 114 of the radio frequency signal is scattered through the selected beamforming scheme by use of either the first antenna array 110 which is configured in the scattering mode or by the dedicated scattering array 150 that is collocated with the first antenna array 110.

In accordance with an embodiment, the selected beamforming scheme comprises a combination of a direct link between the transmitting network node 104 and the second user device, and a scattered link between the transmitting network node 104 and the first user device 118 via the first antenna array 110 of the receiving network node 102. In an implementation, the direct link between the transmitting network node 104 and the second user device (e.g., the user device 120 of FIG. 1A) includes a line of sight (LOS) communication. In the line-of-sight communication, the transmitting network node 104 and the third user device (e.g., the user device 120 of FIG. 1A) are in direct view of each other without having any obstacle between them and communicate with each other via a radio beam. In another implementation, the direct link between the transmitting network node 104 and the second user device (e.g., the user device 120) includes a non-line of sight (NLOS) communication. In the non-line of sight communication, the transmitting network node 104 and the second user device (e.g., the user device 120 of FIG. 1A) are not in direct view of each other and have various obstacles between them. In such a case, one or more other network nodes, such as repeater devices, may be used to form a link with the third user device (e.g., the user device 120 of FIG. 1A) without the use of the receiving network node 102 (i.e., an idle node). In case of the scattered link, the transmitting network node 104 communicates with the first user device 118 through the first antenna array 110 of the receiving network node 102. The transmitting network node 104 (e.g., an active base-station), specifically the third antenna array 112 of the transmitting network node 104, leverages a dual-path channel composed of the direct link (which can be line of sight or the non-line of sight path), plus a scattered path (i.e., the scattered link) which leverage the first antenna array 110 of a neighboring receiving network node 102 (e.g., the idle base-station) placed in controlled scattering mode.

In accordance with an embodiment, the transmitting network node 104 is at least one of a cellular base station and a user device. In a cellular network, such as in new radio (NR) 5G or long-term evolution (LTE) cellular network, the transmitting network node 104 acts as the cellular base station (e.g., a gNB, or eNB). The transmitting network node 104 is potentially a cellular base station, such as an active base station, which uses a neighboring receiving network node (e.g., an idle base-station) placed in controlled scattering mode, in order to execute power-efficient cooperative communication in the cellular network. In another case, the transmitting network node 104 is potentially a user device, such as a UE.

Figure 2A:
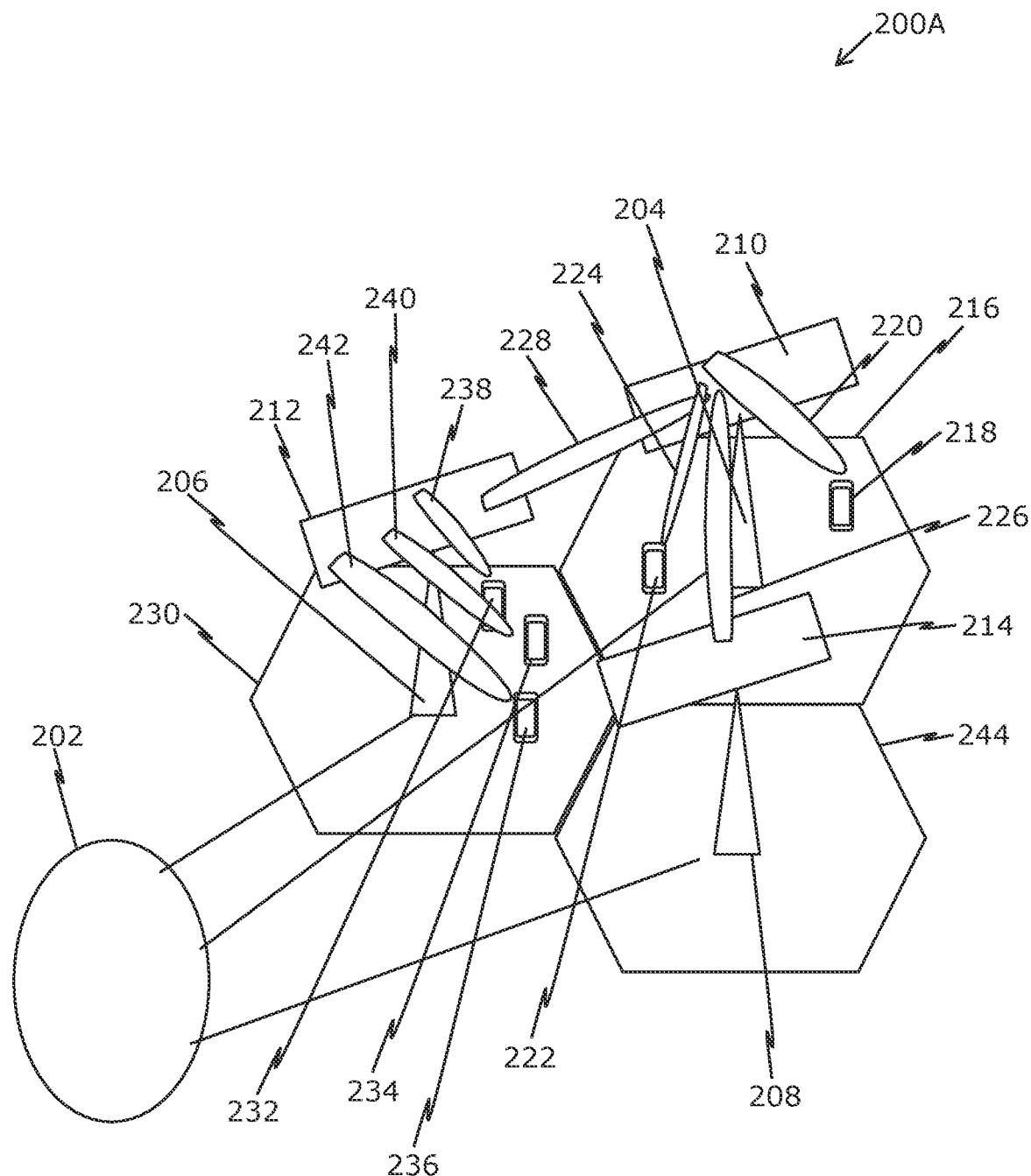
FIG. 2A is an illustration of an exemplary implementation of a wireless network in cooperative communication, in accordance with an embodiment of the present disclosure.

FIG. 2A is an illustration of an exemplary implementation of a wireless network in cooperative communication, in accordance with an embodiment of the present disclosure. FIG. 2A is described in conjunction with elements from FIGS. 1A, 1B, 1C, 1D, and 1E. With reference to FIG. 2A, there is shown a wireless network 200A that includes a central communication device 202, and a plurality of network nodes, such as a receiving network node 204, a transmitting network node 206, and another network node 208. There is further shown a plurality of radio resource units (namely, a first radio resource unit (RRU) 210, a second radio resource unit 212 and a third radio resource unit 214). The receiving network node 204, and the user device 218, and a second user device 222, are present within a second cell 216. The transmitting network node 206 and user devices 232 to 236 are present within a first cell 230, whereas a third network node, such as the network node 208 is present within a third cell 244 (e.g., an active cell).

The central communication device 202 includes suitable logic, circuitry, interfaces, and/or code that is configured to monitor wireless traffic load information associated with the plurality of radio resource units (e.g., The first radio resource unit 210, the second radio resource unit 212 and the third radio resource unit 214) in the wireless network 200A. Examples of the wireless network 200A include, but are not limited to a cellular network, such as a radio access network (RAN) in which all the wireless traffic load information is available at the central communication device 202, or other wireless networks. The central communication device 202 is potentially a cloud server configured for network management and may also be referred as a central unit.

The receiving network node 204 and the transmitting network node 206 correspond to the receiving network node 102 and the transmitting network node 104, respectively of FIG. 1A. In the plurality of radio resource units (RRUs), the first radio resource unit (RRU) 210 is provided in the receiving network node 204, the second radio resource unit 212 is provided in the transmitting network node 206, and the third radio resource unit 214 is provided in the network node 208.

Each of the plurality of radio resource units (namely, the first radio resource unit 210, the second radio resource unit 212 and the third radio resource unit 214) is potentially configured as a radio frequency (RF) circuitry of a base station (e.g., the receiving network node 204 or the transmitting network node 206) which performs radio frequency functions such as transmission and reception of radio frequency signals, filtering, amplification, and the like. Moreover, the plurality of radio resource units can be configured to communicate with a baseband unit (BBU) via a physical communication link (e.g., an optical link) and a user device (e.g., the first user device 218) via a wireless link. Each of the plurality of radio resource units is configured to have one or more antenna arrays.

In operation, the central communication device 202 (or the central unit) is configured to monitor wireless traffic load information associated with the plurality of radio resource units in the wireless network 200A. The central communication device 202 is further configured to send instruction data to the receiving network node 204 based on the monitored wireless traffic load information, the instruction data being configured to switch a first antenna array (e.g., this first antenna array corresponds to the first antenna array 110 of FIG. 1A, which is not shown here for sake of brevity) of a radio resource unit (i.e., the first radio resource unit 210) of the receiving network node 204 from the transmit-receive mode to the scattering mode. The reason is that the receiving network node 204 has a few user devices to serve (e.g., the first user device 218 and the second user device 222), therefore, the instruction data is sent to operate the first antenna array of the receiving network node 204 in the scattering mode. Alternatively stated, based on the monitored wireless traffic load information, the central communication device 202 identifies that the receiving network node 204 is in idle mode (or will be in idle mode). Thus, to serve the limited users of the receiving network node 204, the instruction data is sent to enable the first antenna array of the receiving network node 204 to be configured from the transmit-receive mode to the scattering mode to effectively reduce the overall energy consumption in the low traffic phases (or under load-periods) in the wireless network 200A (e.g., a cellular network).

The central communication device 202 (or the central unit) is further configured to control the transmitting network node 206 located in the first cell 230 to provide a first beam 228 of the radio frequency signal to the first user device 218 located in the second cell 216 via the first antenna array (e.g., the first antenna array 110 of FIG. 1A, which is not shown here for sake of brevity) or a dedicated scattering array. The first antenna array is configured in the scattering mode. In case the dedicated scattering array 150 of FIG. 1B), is used (not shown in FIG. 2A for sake of brevity), the dedicated scattering array 150 is collocated with the first antenna array of the receiving network node 204. In this way, the transmitting network node 206 communicates with the first user device 218 located in the second cell 216 through the first beam 228 that is scattered by the first antenna array of the receiving network node 204 to provide to the first user device 218.

Additionally, the receiving network node 204 is configured to communicate, concurrently to the scattering of the first beam 228 of the radio frequency signal to the first user device 218, the second beam 224 of the radio frequency signal to the second user device 222 via the second antenna array (e.g., the second antenna array 138 of FIG. 1B, which is not shown here for sake of brevity). The user devices 232 to 236 located within the first cell 230 are served by the transmitting network node 206. The transmitting network node 206 operates in the transmit-receive mode and communicates with the user devices 232 to 236 located within the first cell 230 via respective beams of radio frequency signals (namely, a third beam 238, a fourth beam 240 and a fifth beam 242, respectively).

Figure 2B:
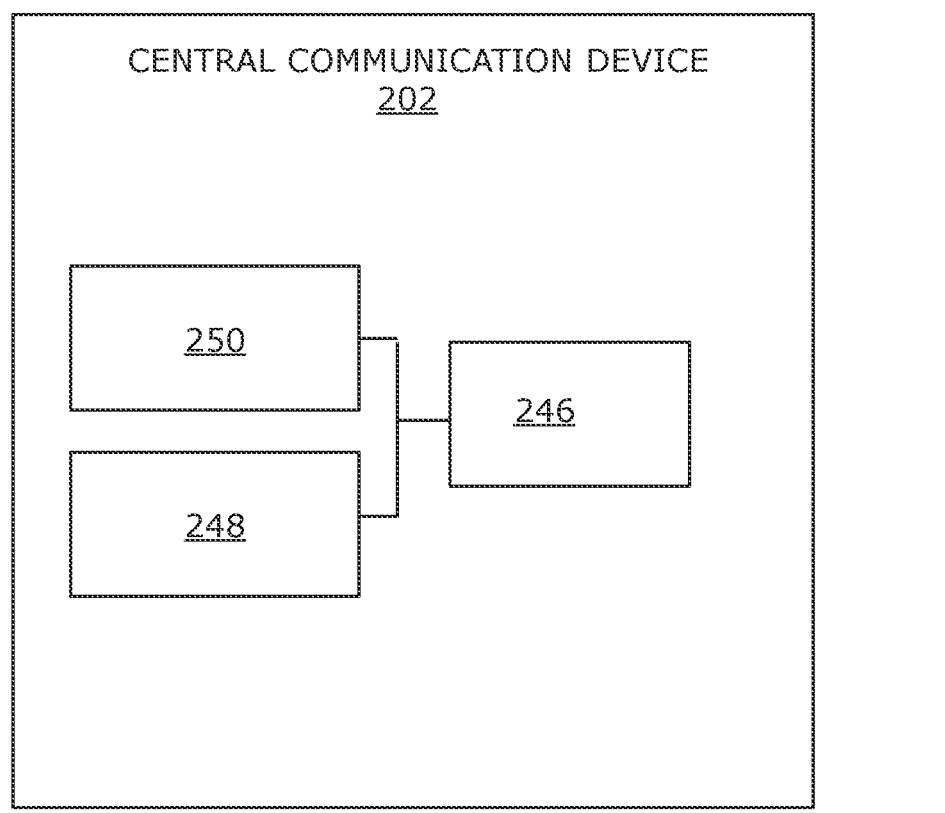
FIG. 2B is a block diagram that illustrates various exemplary components of a central communication device, in accordance with an embodiment of the present disclosure.

FIG. 2B is a block diagram that illustrates various exemplary components of a central communication device (or central unit), in accordance with an embodiment of the present disclosure. FIG. 2B is described in conjunction with elements from FIGS. 1A, 1B, 1C, 1D, 1E, and 2A. With reference to FIG. 2A, there is shown a block diagram 200B of the central communication device 202. The central communication device 202 includes a third control circuit 246, a memory 248, and a network interface 250.

The third control circuit 246 include suitable logic, circuitry, interfaces, and/or code that is configured to monitor wireless traffic load information associated with the plurality of radio resource units (e.g., the radio resource units 210 to 214) in the wireless network 200A. The third control circuit 246 is further configured to execute instructions stored in the memory 248. Examples of the third control circuit 246 may include, but are not limited to an integrated circuit, a co-processor, a microprocessor, a microcontroller, a complex instruction set computing (CISC) processor, an application-specific integrated circuit (ASIC) processor, a reduced instruction set (RISC) processor, a very long instruction word (VLIW) processor, a central processing unit (CPU), a state machine, a data processing unit, and other processors or circuits. Moreover, the third control circuit 246 may refer to one or more individual processors, processing devices, a processing unit that is part of a machine.

The memory 248 may include suitable logic, circuitry, and/or interfaces that is configured to store machine code and/or instructions executable by the third control circuit 246 (e.g., a processor). Examples of implementation of the memory 248 may include, but are not limited to, Electrically Erasable Programmable Read-Only Memory (EEPROM), Random Access Memory (RAM), Read Only Memory (ROM), Hard Disk Drive (HDD), Flash memory, a Secure Digital (SD) card, Solid-State Drive (SSD), a computer readable storage medium, and/or CPU cache memory. The memory 248 may store an operating system and/or a computer program product to operate the central communication device 202. A computer readable storage medium for providing a non-transient memory may include, but is not limited to, an electronic storage device, a magnetic storage device, an optical storage device, an electromagnetic storage device, a semiconductor storage device, or any suitable combination of the foregoing.

In operation, the third control circuit 246 (of the central communication device 202) is configured to monitor wireless traffic load information associated with a plurality of radio resource units in a wireless network. For example, wireless traffic load information includes a number of user devices (or user equipment) associated with the plurality of radio resource units in the wireless network (e.g., the wireless network 200A). Based on monitoring of the wireless traffic load information, the third control circuit 246 decides a communication mode (or an operating mode) for each of the plurality of radio resource units.

In operation, the third control circuit 246 is further configured to send instruction data to the receiving network node 204 based on the monitored wireless traffic load information, the instruction data being instructions to switch the first antenna array (e.g., the first antenna array 110) of the radio resource unit (e.g., the first radio resource unit 210) of the receiving network node 204 from a transmit-receive mode to a scattering mode. Based on the monitored wireless traffic load information, the third control circuit 246 communicates instruction data to the receiving network node 204. The instruction data includes a set of instructions which is used to configure the first antenna array (e.g., the first antenna array 110) of the radio resource unit (e.g., the first radio resource unit 210) of the receiving network node 204 from the transmit-receive mode to the scattering mode.

The third control circuit 246 is further configured to control the transmitting network node 206 located in the first cell 230 to provide the first beam 228 of the radio frequency signal to the first user device 218 located in the second cell 216 via the first antenna array (e.g., the first antenna array 110) configured in the scattering mode or a dedicated scattering array 150 collocated with the first antenna array (e.g., the first antenna array 110) of the receiving network node 204. In an implementation, the first beam 228 of the radio frequency signal is provided to the first user device 218 by use of the first antenna array (e.g., the first antenna array 110) which is configured in the scattering mode. In another implementation, the first beam 228 of the radio frequency signal is provided to the first user device 218 by use of the dedicated scattering array 150 that is collocated with the first antenna array (e.g., the first antenna array 110) of the receiving network node 204. In such a case, the dedicated scattering array 150) operates in the scattering mode while the first antenna array (e.g., the first antenna array 110) operates in the transmit-receive mode.

In accordance with an embodiment, the third control circuit 246 is further configured to determine, based on the monitored wireless traffic load information, one or more first radio resource units of the transmitting network node 206 located in the first cell 230 that are to remain active for a time period, and one or more second radio resource units of the receiving network node 204 located in the second cell 216 that are to be idle for the upcoming time period. The third control circuit 246 monitors the wireless traffic load information associated with each radio resource unit of the receiving network node 204 and the transmitting network node 206 as well. Based on the monitored wireless traffic load information, the third control circuit 246 decides whether any network node (e.g., the receiving network node 204) is required to operate in the scattering mode (i.e., controlled low-energy consuming mode) for the time period. The receiving network node 204 is instructed to operate in the scattering mode when one or more radio resource units (e.g., the first radio resource unit 210) associated with it (i.e., the receiving network node 204) are to be idle for the time period (e.g., an upcoming time period). Similarly, the third control circuit 246 decides whether the transmitting network node 206 is to be active and operate in the transmit-receive mode for the time period. For the transmitting network node 206 to operate in the transmit-receive mode, the one or more radio resource units (e.g., the second radio resource unit 212) remain active for the time period.

In accordance with an embodiment, the scattering mode is a mode, in which one or more radio frequency components (e.g., the one or more radio frequency components 140) associated with the first antenna array (e.g., the first antenna array 110) of the receiving network node 204 are in an idle mode and a scattering characteristic of the first antenna array (e.g., the first antenna array 110) or the dedicated scattering array 150 is in a controlled power state to deflect the first beam 228 of the radio frequency signal to the first user device 218. The controlled power state is an extremely low power state that is substantially less than a power state of the transmit-receive mode. In the scattering mode the one or more radio frequency components (e.g., the one or more radio frequency components 140) of the receiving network node 204 are in the idle mode which results in low power consumption. Additionally, the receiving network node 204 communicates with the first user device 218 by virtue of the scattering characteristic of either the first antenna array (e.g., the first antenna array 110) or the dedicated scattering array 150.

Figure 3A:
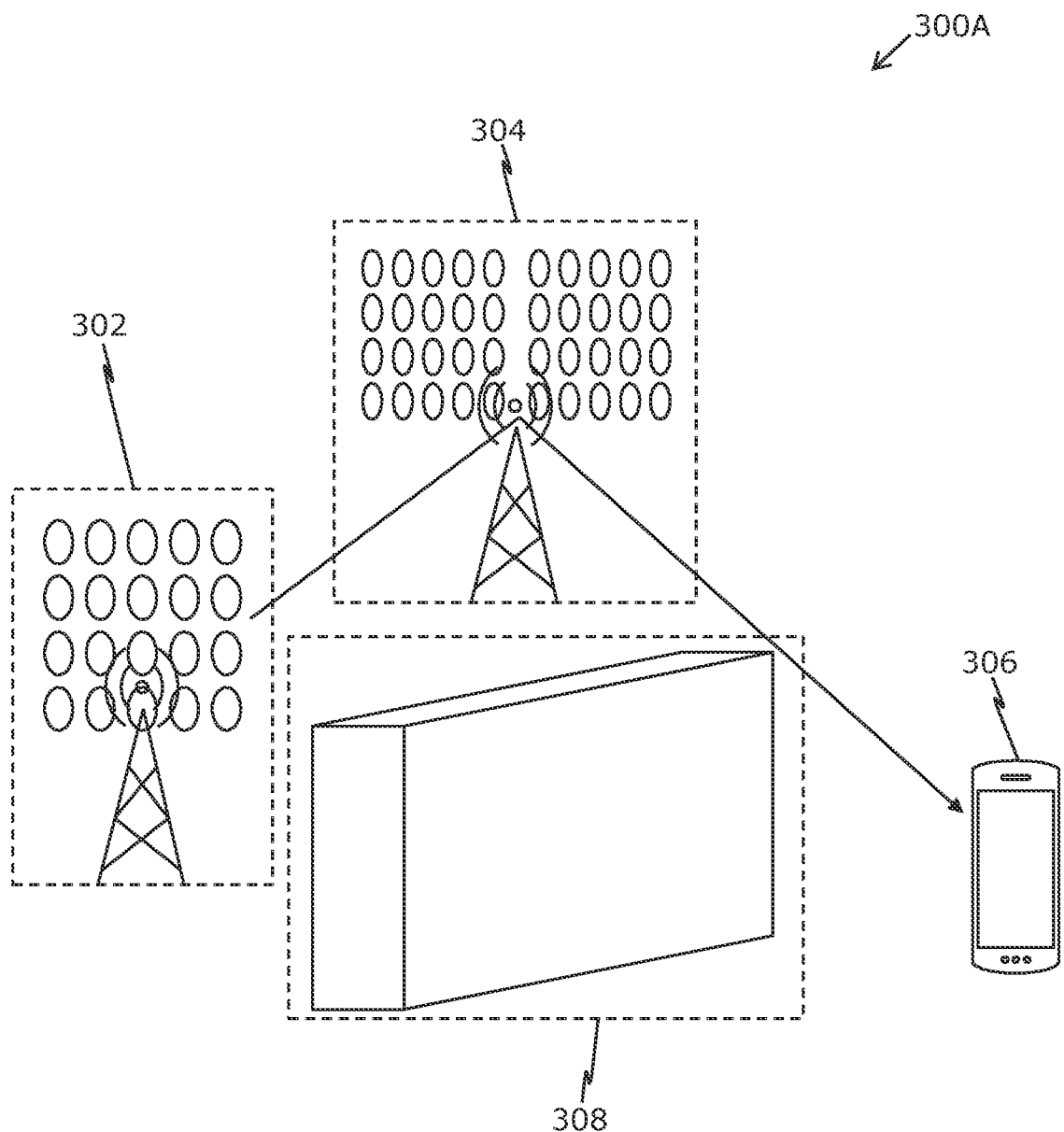
FIG. 3A is an illustration of an exemplary scenario of cooperative scattering in a wireless network, in accordance with another embodiment of the present disclosure.

FIG. 3A is an illustration of an exemplary scenario of cooperative scattering in a wireless network, in accordance with another embodiment of the present disclosure. FIG. 3A is described in conjunction with elements from FIGS. 1A, 1B, 1C, 1D, 1E, 2A and 2B. With reference to FIG. 3A, there is shown a wireless network 300A that includes a first base station 302, a second base station 304, a user device 306 and a blockage 308 (e.g., a signal obstructing object).

The first base station 302 is configured as an active base station which means the first base station 302 operates in the transmit-receive mode in order to serve large number of user devices. Whereas the second base station 304 is configured as an idle base station which means the second base station 304 operates in the controlled scattering mode in order to serve limited number of user devices such as the user device 306. In this exemplary scenario, each of the first base station 302 and the second base station 304 potentially operates in the band of, for example, 3.5 GHz and has an antenna array of size N. The first base station 302 corresponds to the transmitting network node 104 (of FIG. 1A) and the second base station 304 corresponds to the receiving network node 102 (of FIG. 1A). The user device 306 is located under the coverage area (e.g., the second cell 108 of FIG. 1A) of the second base station 304 and equipped with M antennas. In this embodiment, M is considered equal to 1 for simplicity. The first base station 302 may not communicate directly to the user device 306 because of the blockage 308 (e.g., strong blockage), therefore, the user device 306 can only receive the scattered signals from the antenna array (e.g., the first antenna array 110 of FIG. 1A) of the second base station 304. Therefore, in the wireless network 300A, the second base station 304 operates in the controlled scattering mode (i.e., low-power consuming mode) to serve the user device 306 in the coverage area covered by the second base station 304 (e.g., the second cell 108).

A signal model (y) between a transmitting antenna (e.g., $i_{th}$ antenna) at the first base station 302 and a user antenna can be written in the form of the equation (equation 1)

$$y=\sigma x+z \tag{1}$$

where σ can be written in the form of the equation (equation 2)

$$\sigma=A|P_r^H(Z_a+Z_L)^{-1}P_t|^2 \tag{2}$$

where $P_t$ is a vector that represents a link between the antenna array (e.g., the third antenna array 112 of FIG. 1A) at the first base station 302 and an antenna of interest (e.g., the first antenna 108A of the first antenna array 110 of FIG. 1A) at the second base station 304. Similarly, $P_r$ is a vector that represents a link between the antenna array (e.g., the first antenna array 110 of FIG. 1A) at the second base station 304 and the user device 306. Additionally, the matrix $Z_a$ represents a coupling among antenna elements at the second base station 304 and $Z_L$ is a diagonal matrix with the values of the configurable loads (e.g., the one or more configurable loads 142 of FIG. 1B) for the antenna elements in scattering mode at the second base station 304.

Figure 3B:
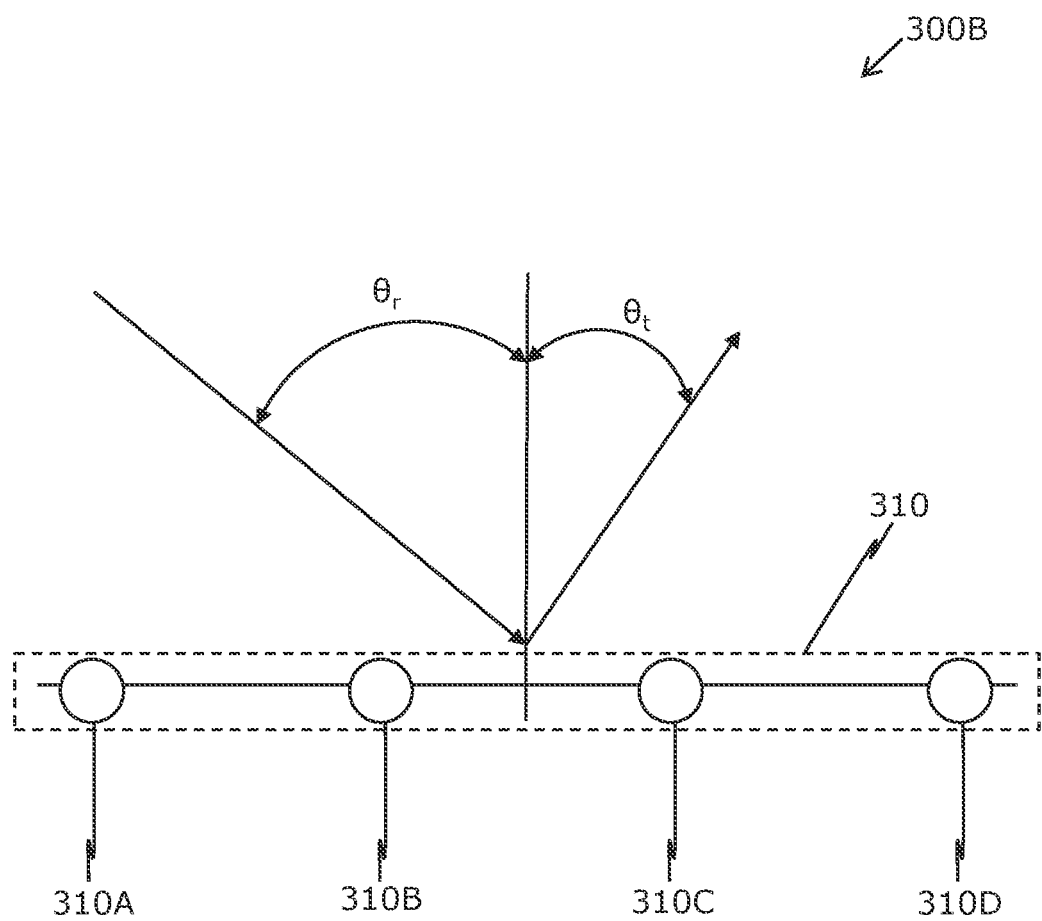
FIG. 3B is an illustration of an exemplary scenario related to configuration of loads for a uniform linear array (ULA) of antennas in cooperative scattering, in accordance with an embodiment of the present disclosure.

FIG. 3B is an illustration of an exemplary scenario to depict a configuration of loads for a uniform linear array (ULA) of antennas in cooperative scattering, in accordance with an embodiment of the present disclosure. FIG. 3B is described in conjunction with elements from FIGS. 1A, 1B, 1C, 1D, 1E, 2A, 2B, and 3A. With reference to FIG. 3B, there is shown an exemplary scenario 300B that includes a uniform linear array 310. In the exemplary scenario, the uniform linear array 310 includes a first antenna element 310A, a second antenna element 310B, a third antenna element 310C and a fourth antenna element 310D.

The uniform linear array 310 belongs to the second base station 304 of FIG. 3A. For the uniform linear array 310, the direction of incidence (i.e., $\theta_r$) to the second base station 304 and the direction of departure (i.e., $\theta_t$) from the second base station 304, for the vectors $P_t$ and $P_r$, respectively, are known. Therefore, the value of a k-th coefficient of the vectors $P_t$ and $P_r$, is represented by the equation (equation 3)

$$P(\theta)|_k=\exp(2i\pi d(k-1)\sin(\theta)/\lambda)\forall k=1,2,\ldots,K \tag{3}$$

where θ is either the angle of incidence (i.e., $\theta_r$ for the vector $P_t$ from the first base station 302 to the second base station 304) or the angle of departure (i.e., $\theta_t$ for the vector $P_r$ from the second base station 304 to the user device 306), λ is the wavelength related to the carrier frequency, and d is the inter-element distance between the antenna elements (e.g., the first antenna element 310A, the second antenna element 310B, the third antenna element 310C and the fourth antenna element 310D) at the second base station 304. To reflect the signal (e.g., the signal model considered in the FIG. 3A) in the direction from $\theta_r$ to $\theta_t$ (i.e., from the first base station 302 to the user device 306), the configurable loads (e.g., the one or more configurable loads 142 of FIG. 1B) are set in order to maximize the value of the configurable loads according to the equation (equation 4)

$$Z_L=\text{argmax}_{\{Z_{min},Z_{max}\}}|P_T^H(Z_a+Z_L)^{-1}P_t|^2 \tag{4}$$

when the coupling matrix (i.e., $Z_a$) is a diagonal matrix, the solution of the equation 4 can be obtained by rewriting the quantity, $P_r^H(Z_a+Z_L)^{-1}P_t$ in the equation 4 as $P_r^H\text{diag}(P_t)\text{diag}(Z_a+Z_L)^{-1}$. In an example, an operator "diag" when applied on a matrix, provides the diagonal elements of the matrix in the form of a vector. In another example, the operator "diag" when applied on a vector, provides a matrix whose diagonal elements are the elements of the aforementioned vector. The optimization problem represented in the equation 4 is convex in $Z_L^{-1}$ and can be solved by use of a numerical convex optimization tool.

In another implementation, it is considered that the uniform linear array 310 includes 10 antenna elements which are uniformly spaced and have a spacing of half wavelength, for example, at 3.5 GHz (an operating frequency of base station). The coupling matrix $Z_a$ is assumed to be constant and has the value of diagonal elements as 50Ω which indicates the negligible coupling among the antenna elements of the uniform linear array 310. For a signal with an angle of incidence (i.e., $\theta_r$) of −60° and an angle of departure (i.e., $\theta_t$) of 0°, the value of x can be calculated by maximizing the equation 4 and result is represented by the equation (equation 5)

$$Z_L=\text{diag}([14,-60,-129,87,29,-76,-46,85,23,-85]i\Omega) \tag{5}$$

The values of impedances (e.g., represented by the equation 5) are typical values which can be calculated with a proper combination of variable capacitors and inductors in different configurations. Optionally, the values of impedances (i.e., $Z_L$) can be precomputed for a set of the angle of incidence (i.e., $\theta_r$) and the angle of departure (i.e., $\theta_t$) as a codebook.

Figure 3C:
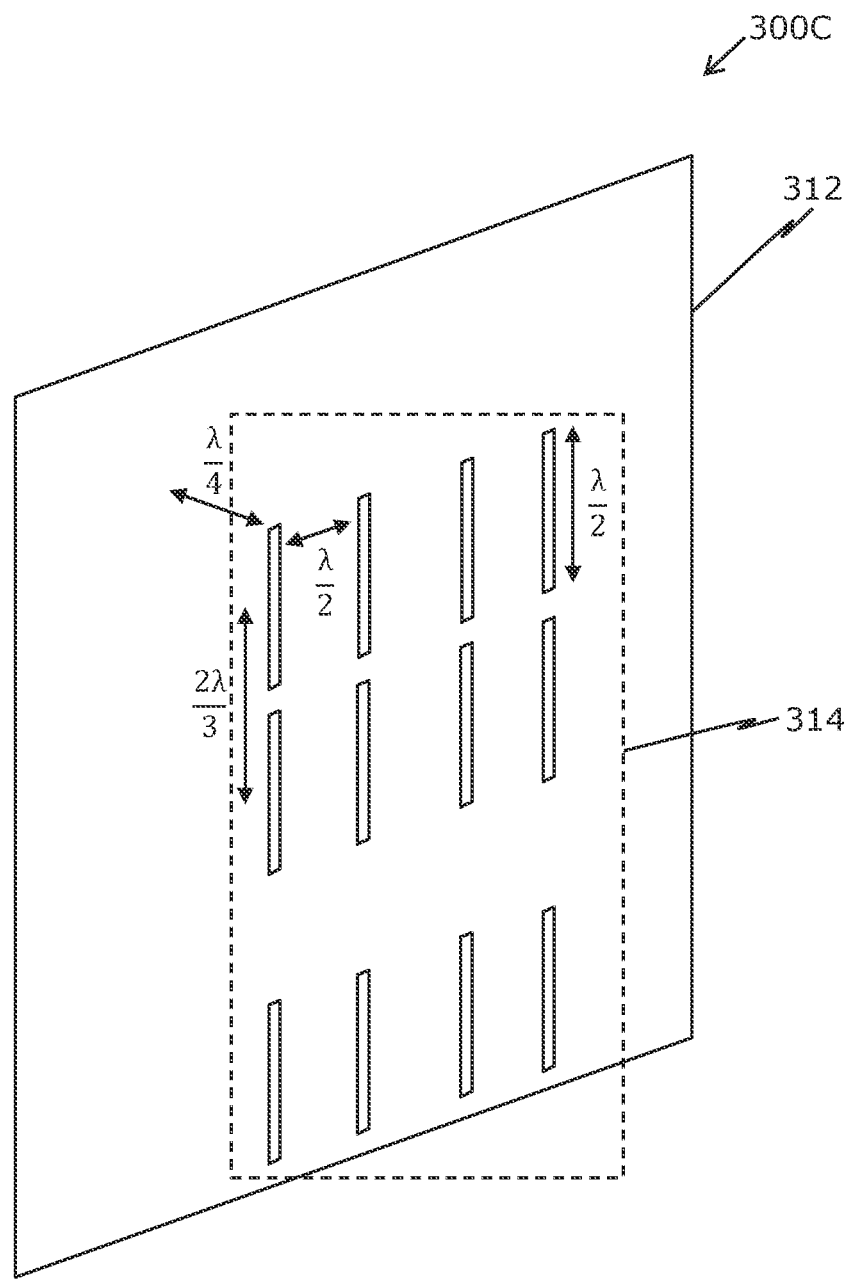
FIG. 3C is an illustration of an exemplary scenario related to configuration of loads for a uniform planar array (UPA) of antennas in cooperative scattering, in accordance with an embodiment of the present disclosure.

FIG. 3C is an illustration of an exemplary scenario to depict configuration of loads for a uniform planar array (UPA) of antennas in cooperative scattering, in accordance with an embodiment of the present disclosure. FIG. 3C is described in conjunction with elements from FIGS. 1A, 1B,

1C, 1D, 1E, 2A, 2B, 3A, and 3B. With reference to FIG. 3C, there is shown an exemplary scenario 300C that includes a metallic plate 312 and a uniform planar array 314.

The uniform planar array 314 is a two-dimensional version of the uniform linear array 310 of FIG. 3B. In this exemplary scenario, the uniform planar array 314 includes 7 horizontal and 7 vertical antenna elements and thus, has a total of 49 antenna array elements. In such a case, in order to make impedance and coupling computations more precise, the antenna elements are assumed to be half-wave dipole antennas (i.e., $\lambda/2$), which have a length equal to half of wavelength. Moreover, the uniform planar array 314 is assumed to be located in a plane which is $\lambda/4$ distanced apart from the metallic plate 312. The metallic plate 312 extends beyond the projection of the antenna elements on itself by $3\lambda$ in the vertical and in the horizontal directions as well.

Figure 3D:
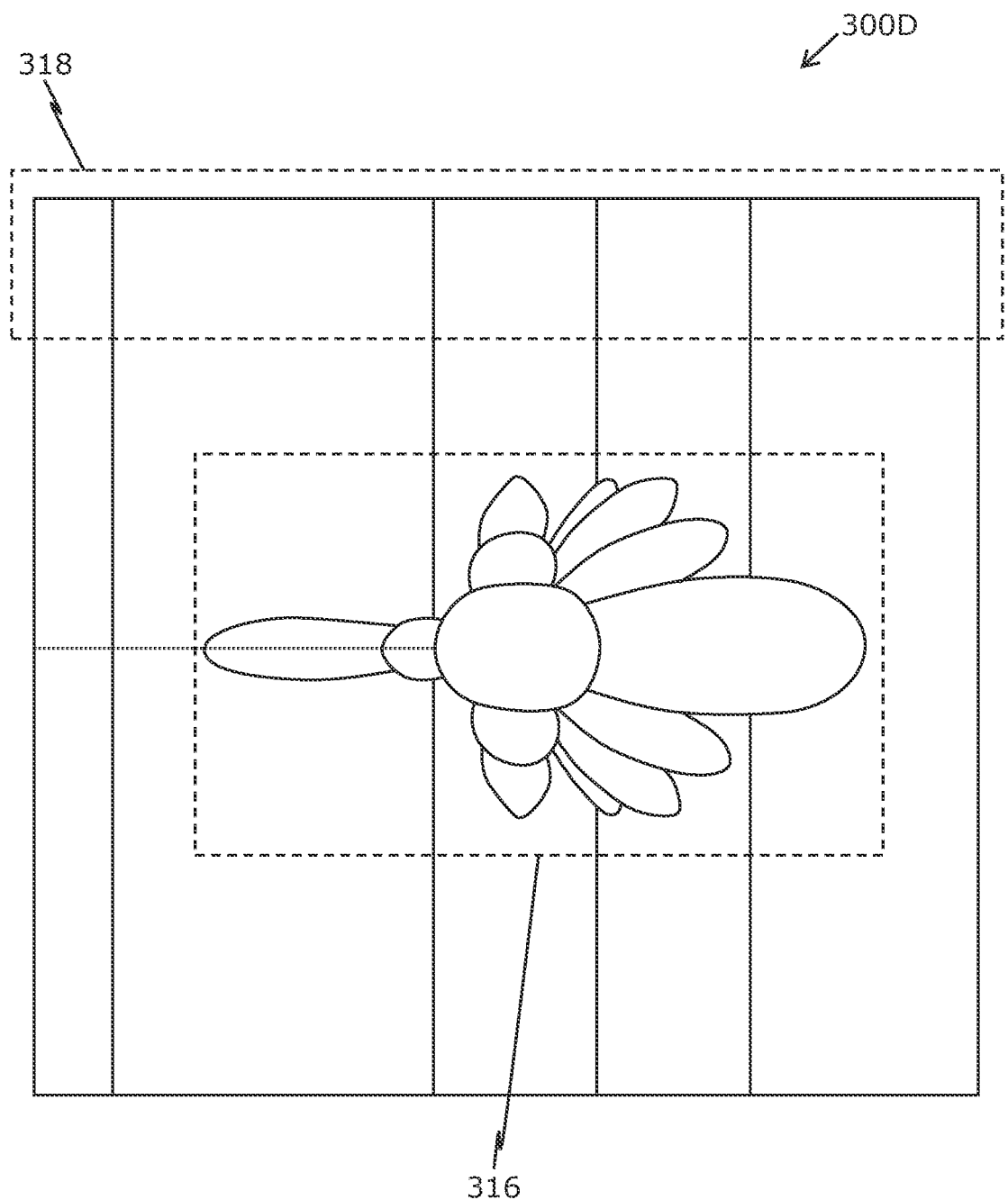
FIG. 3D is an illustration of a scattering pattern from a uniform planar array, in accordance with an embodiment of the present disclosure.
Figure 3E:
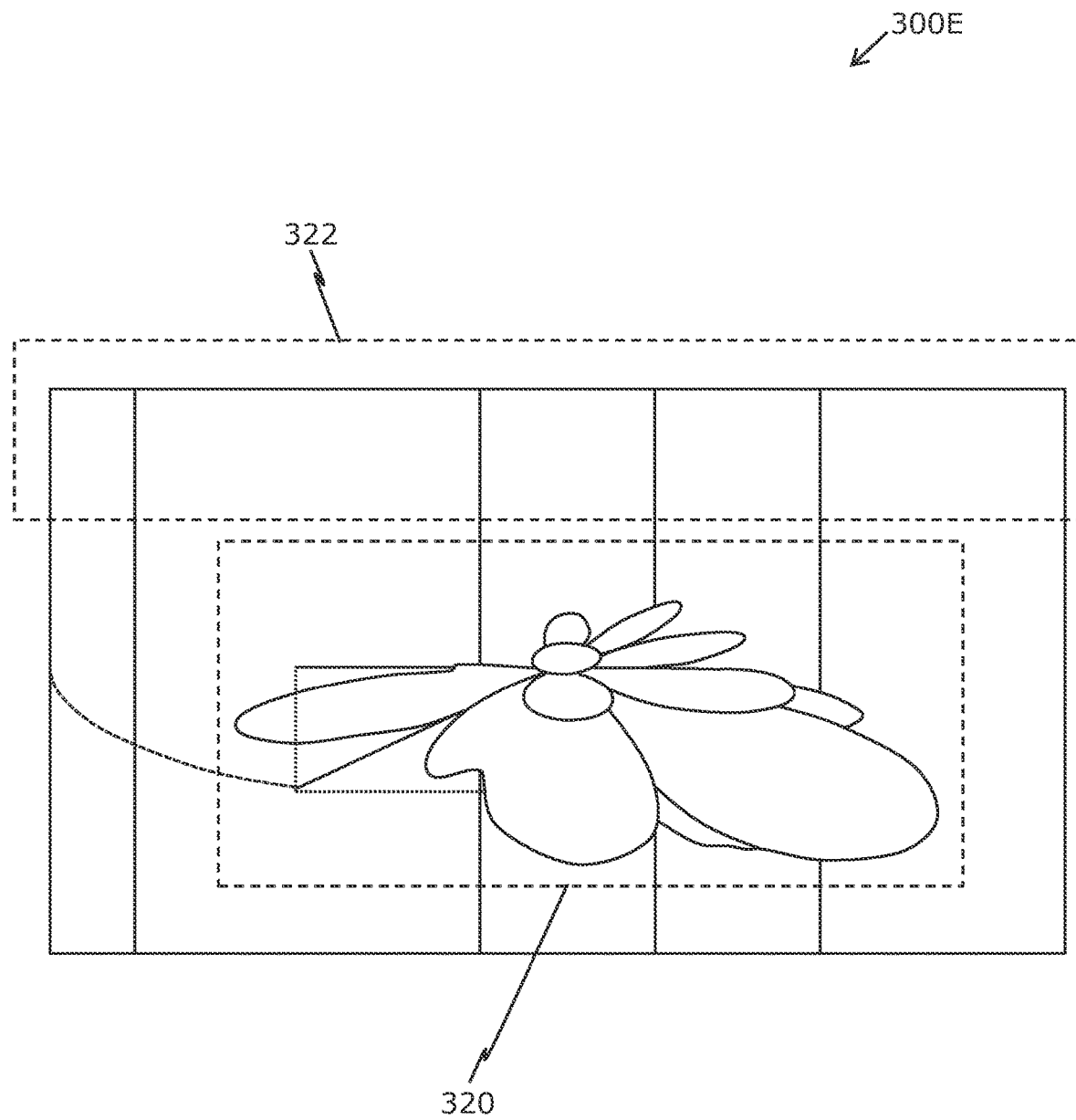
FIG. 3E is an illustration of a scattering pattern from a uniform planar array, in accordance with another embodiment of the present disclosure.

The signal model (or system model) for the uniform planar array 314 is same as considered for the uniform linear array 310 in FIG. 3B. However, the mathematical expressions for the vectors $P_t$ and $P_r$ are different. The coupling matrix (i.e., $Z_a$) also has a different expression which is now more precisely specified by virtue of dependence on the antenna array elements (e.g., the dipole antenna elements or dipoles). By use of an optimization tool, the values of the configurable loads (e.g., the one or more configurable loads 142) obtained is represented in the equation (equation 6)

$$Z_L = \text{diag}([77, -16, -128, 105, 83, -32, -114] i\Omega) \otimes I_7 \qquad (6)$$

where, $\otimes$ represents the Kronecker product, $I_7$ represents the identity matrix of size 7×7 and working of the uniform planar array 314 represents the fact that, when the scattering is intended in the horizontal plane, the configurable loads (e.g., the one or more configurable loads 142 of FIG. 1B) are configured with the same values in the vertical plane (e.g., the values are meant by the uniform phase in the vertical direction) and described in detail, for example in FIGS. 3D and 3E. Therefore, only 7 different values determine the desired load configuration when scattering is intended in the horizontal plane.

FIG. 3D is an illustration of a scattering pattern from a uniform planar array, in accordance with an embodiment of the present disclosure. FIG. 3D is described in conjunction with elements from FIGS. 1A, 1B, 1C, 1D, 1E, 2A, 2B, 3A, 3B, and 3C. With reference to FIG. 3D, there is shown a scattering pattern 300D that includes a plurality of beams 316 and a plurality of vertical stripes 318.

The plurality of beams 316 represents the intensity of the scattered energy towards the corresponding direction. The scattering pattern 300D is for the angle of incidence (i.e., $\theta_r$) equal to $-30°$ and the configurable load (e.g., the one or more configurable loads 142) is optimized for scattering with the angle of departure (i.e., $\theta_t$) equal to $0°$, in the horizontal plane. The plurality of beams 316 may also be referred as a radiation plot.

The vertical stripes 318 in the background of the plurality of beams 316 (or the radiation plot) represents the distribution of the phase required to be implemented by the configurable loads (e.g., the one or more configurable loads 142) at the corresponding antenna elements (or dipoles) of the uniform planar array 314 (of FIG. 3C) in order to synthesize the scattering pattern (e.g., the scattering pattern 300D).

FIG. 3E is an illustration of a scattering pattern from a uniform planar array, in accordance with another embodiment of the present disclosure. FIG. 3E is described in conjunction with elements from FIGS. 1A, 1B, 1C, 1D, 1E, 2A, 2B, 3A, 3B, 3C, and 3D. With reference to FIG. 3E, there is shown a scattering pattern 300E that includes a plurality of beams 320 and a plurality of vertical stripes 322.

The plurality of beams 320 represents the intensity of the scattered energy towards the corresponding direction. The scattering pattern 300E is for different angle of incidence and angle of departure. The vertical stripes 322 represents the distribution of the phase required to be implemented by the configurable loads (e.g., the one or more configurable loads 142) at the corresponding antenna elements (or dipoles). The vertical stripes 322 may also represent the uniform phase in the vertical direction.

Figure 4:
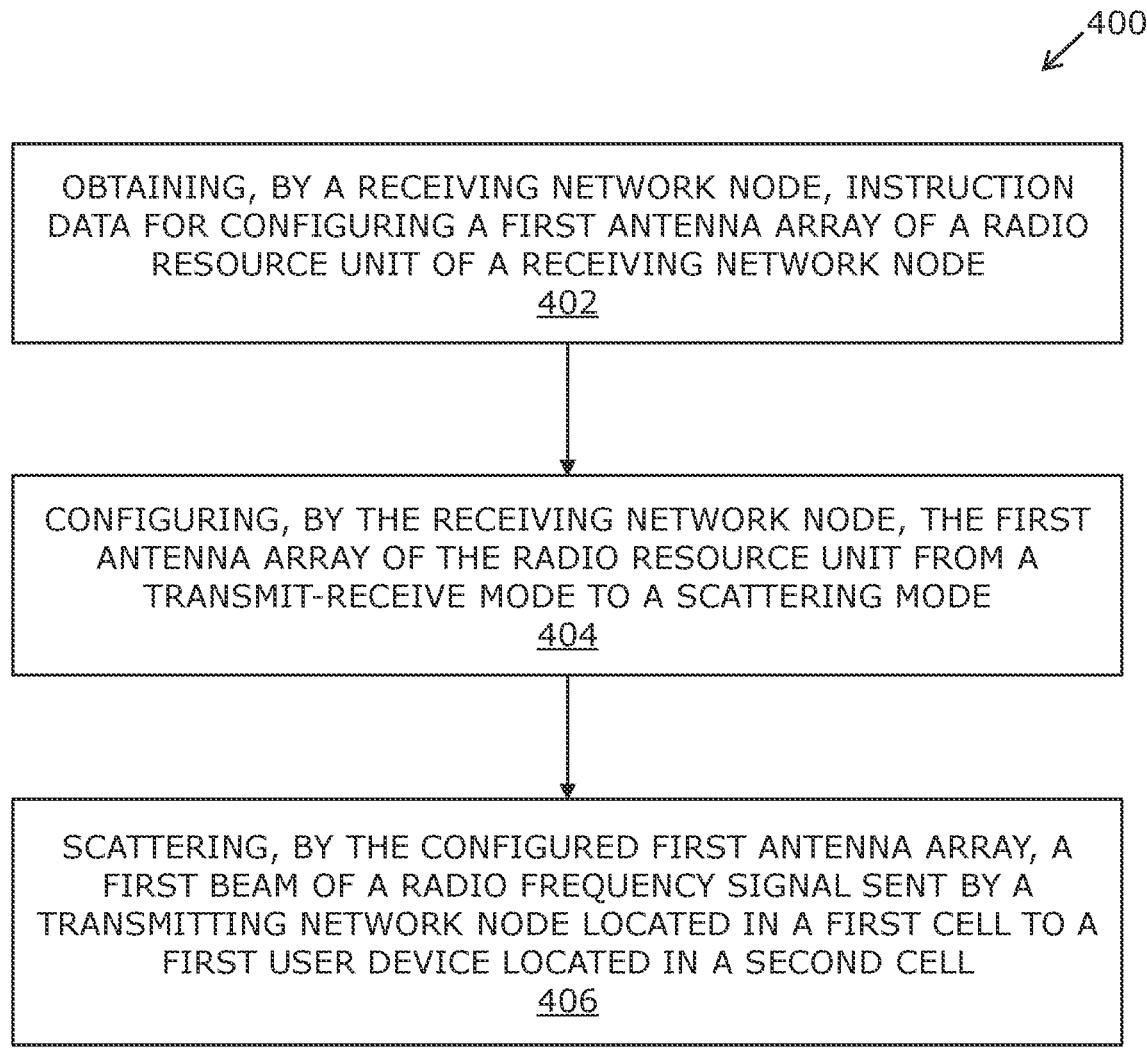
FIG. 4 is a flowchart of a method for executing a cooperative communication in a wireless network, in accordance with an embodiment of the present disclosure.

FIG. 4 is a flowchart of a method for executing a cooperative communication in a wireless network, in accordance with an embodiment of the present disclosure. The method 400 is executed by the receiving network node 102, described for example, in FIGS. 1A and 1B. The method 400 includes steps 402 to 406.

At step 402, the method 400 comprises obtaining, by the receiving network node 102, instruction data for configuring the first antenna array 110 of a radio resource unit (e.g., the first radio resource unit 210) of the receiving network node 102. The first control circuit 144 of the receiving network node 102 is configured to obtain the instruction data for the configuring of the first antenna array 110 of the radio resource unit. An example of obtaining instruction data by the receiving network node 102 has been described in detail, for example, in FIGS. 1A and 2A.

At step 404, the method 400 further comprises configuring, by the receiving network node 102, the first antenna array 110 of the radio resource unit from a transmit-receive mode to a scattering mode. The first control circuit 144 of the receiving network node 102 is configured to configure the first antenna array 110 of the radio resource unit from the transmit-receive mode to the scattering mode. An example of the configuration of the first antenna array 110 from the transmit-receive mode to the scattering mode has been described in detail, for example, in FIGS. 1C and 1D.

At step 406, the method 400 comprises scattering, by the configured first antenna array 110, a first beam of a radio frequency signal sent by a transmitting network node located in a first cell, to a first user device located in a second cell. The first antenna array 110 of the receiving network node 102 is configured to scatter the first beam 114 of the radio frequency signal sent by the transmitting network node 104 located in the first cell 106, to the first user device 118 located in the second cell 108. An example of scattering the first beam 114 of the radio frequency signal to the first user device 118 has been described, in detail, for example, in FIGS. 1A and 2A.

In accordance with an embodiment, the method 400 further comprises setting the second antenna array 138 of the receiving network node 102 in the transmit-receive mode and communicating, concurrently to the scattering of the first beam 114 of the radio frequency signal to the first user device 118, a second beam of a radio frequency signal to a second user device 222 via the second antenna array 138. The first control circuit 144 of the receiving network node 102 is configured to set the second antenna array 138 in the transmit-receive mode and communicate the second beam (e.g., second beam 224) by use of the second antenna array 138. An example of communication of the second beam of the radio frequency signal to the second user device has been described in detail, for example, in FIG. 2A.

The steps 402 to 406 are only illustrative and other alternatives can also be provided where one or more steps are added, one or more steps are removed, or one or more steps are provided in a different sequence without departing from the scope of the claims herein.

Figure 5:
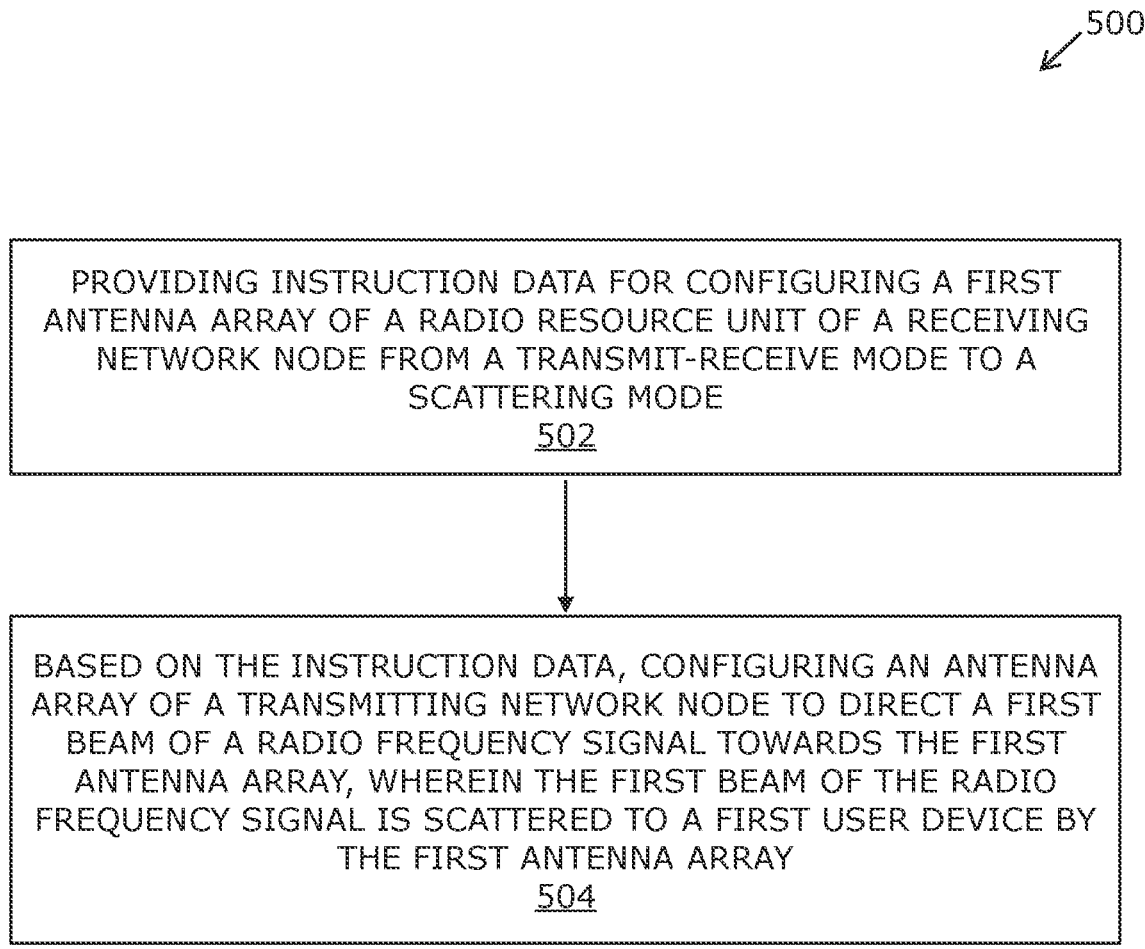
FIG. 5 is a flowchart of a method for executing a cooperative communication in a wireless network, in accordance with another embodiment of the present disclosure.

FIG. 5 is a flowchart of a method for executing a cooperative communication in a wireless network, in accordance with an embodiment of the present disclosure. The method 500 is executed by the transmitting network node 104. The method 500 includes steps 502 and 504.

At step 502, the method 500 comprises providing instruction data for configuring the first antenna array 110 of a radio resource unit of the receiving network node 102 from a transmit-receive mode to a scattering mode. The second control circuit 156 of the transmitting network node 104 is configured to provide instruction data for configuring the first antenna array 110 of the radio resource unit of the receiving network node 102 from the transmit-receive mode to the scattering mode. An example for providing instruction data for configuring the first antenna array 110 of the radio resource unit of the receiving network node 102 has been described in detail, for example, in FIGS. 1A and 2A.

At step 504, the method 500 further comprises, based on the instruction data, configuring an antenna array (e.g., the third antenna array 112) of the transmitting network node 104 to direct the first beam 114 of a radio frequency signal towards the first antenna array 110, wherein the first beam 114 of the radio frequency signal is scattered to the first user device 118 by the first antenna array 110. The second control circuit 156 of the transmitting network node 104 is configured to configure the antenna array (e.g., the third antenna array 112) to direct the first beam 114 of the radio frequency signal towards the first antenna array 110.

In accordance with an embodiment, the method 500 further comprises executing a channel sounding operation to determine if the first user device 118 is detectable within the second cell 108. The second control circuit 156 of the transmitting network node 104 is configured to execute the channel sounding operation to determine if the first user device 118 is detectable within the second cell 108.

In accordance with an embodiment, the method 500 further comprises establishing a radio resource control connection with the first user device 118 and disconnecting the first user device 118 from the receiving network node 102. The method 500 further comprises attaching the first user device 118 to the transmitting network node 104 for the first user device 118 to receive the first beam 114 of the radio frequency signal scattered via the first antenna array 110. The second control circuit 156 of the transmitting network node 104 is configured to establish the radio resource control connection with the first user device 118 and attach the first user device 118 to the transmitting network node 104.

In accordance with an embodiment, the method 500 further comprises selecting a beamforming scheme from a plurality of beamforming schemes to transmit the first beam 114 of the radio frequency signal to the receiving network node 102, wherein the transmitted first beam 114 of the radio frequency signal is scattered by at least one of: the first antenna array 110 configured in the scattering mode, or a dedicated scattering array of the receiving network node 102. The second control circuit 156 of the transmitting network node 104 is further configured to select the beamforming scheme from the plurality of beamforming schemes to transmit the first beam 114 of the radio frequency signal to the receiving network node 102.

The steps 502 and 504 are only illustrative and other alternatives can also be provided where one or more steps are added, one or more steps are removed, or one or more steps are provided in a different sequence without departing from the scope of the claims herein.

Figure 6:
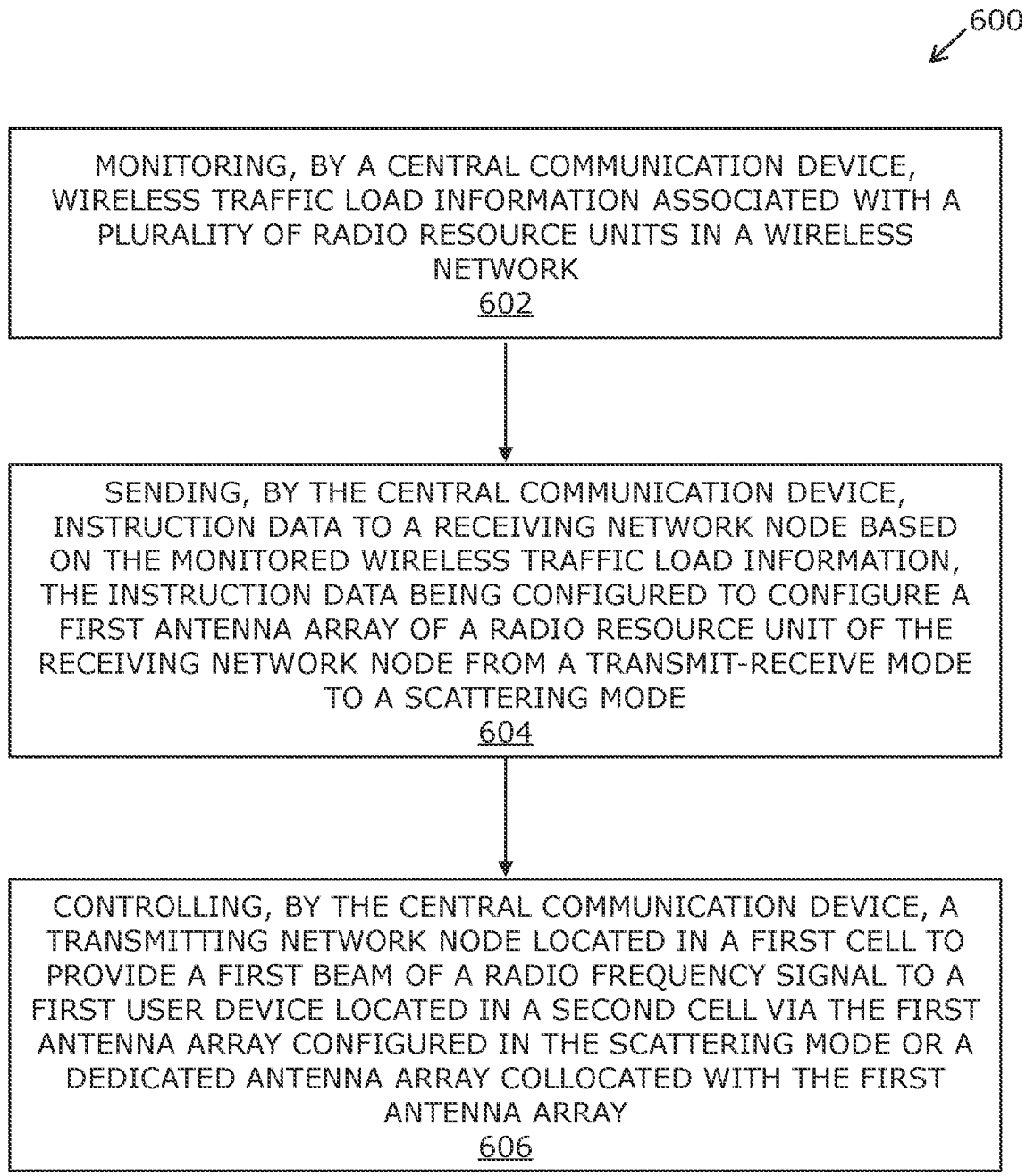
FIG. 6 is a flowchart of a method for executing a cooperative communication in a wireless network, in accordance with yet another embodiment of the present disclosure.

FIG. 6 is a flowchart of a method for executing a cooperative communication in a wireless network, in accordance with an embodiment of the present disclosure. The method 600 is executed by the central communication device 202. The method 600 includes steps 602 to 606.

At step 602, the method 600 comprises monitoring wireless traffic load information associated with a plurality of radio resource units in the wireless network 200A. The third control circuit 246 of the central communication device 202 is configured to monitor wireless traffic load information associated with the plurality of radio resource units (e.g., radio resource units 210, 212, and 214) in the wireless network 200A. The monitoring of the wireless traffic load information has been described in detail, for example, in FIG. 2A.

At step 604, the method 600 further comprises sending instruction data to the receiving network node 102 based on the monitored wireless traffic load information, the instruction data being instructions to switch the first antenna array 110 of a radio resource unit of the receiving network node 102 from a transmit-receive mode to a scattering mode. The third control circuit 246 of the central communication device 202 is configured to send instruction data to the receiving network node 102 based on the monitored wireless traffic load information, the instruction data being instructions to switch the first antenna array 110 of the radio resource unit of the receiving network node 102 from the transmit-receive mode to the scattering mode. The switching of the first antenna array 110 of the receiving network node 102 from the transmit-receive mode to the scattering mode has been described in detail, for example, in FIG. 2A.

At step 606, the method 600 further comprises controlling the transmitting network node 104 located in the first cell 106 to provide a first beam (e.g., the first beam 114) of a radio frequency signal to the first user device 118 located in the second cell 108 via the first antenna array 110 configured in the scattering mode or a dedicated scattering array collocated with the first antenna array 110 of the receiving network node 102. The third control circuit 246 of the central communication device 202 is configured to control the transmitting network node 104 located in the first cell 106 to provide the first beam 114 of the radio frequency signal to the first user device 118 located in the second cell 108 via the first antenna array 110 configured in the scattering mode or the dedicated scattering array 150 collocated with the first antenna array 110.

In accordance with an embodiment, the method 600 further comprises determining, based on the monitored wireless traffic load information, one or more first radio resource units of the transmitting network node 104 located in the first cell 106 that are to remain active for a time period (e.g., an upcoming time period), and one or more second radio resource units of the receiving network node 102 located in the second cell 108 that are to be idle for the time period. The third control circuit 246 of the central communication device 202 is configured to determine based on the monitored wireless traffic load information the time period for which the transmitting network node 104 is to remain active and the receiving network node 102 is to be idle.

The steps 602 to 606 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural. The word "exemplary" is used herein to mean "serving as an example, instance or illustration". Any embodiment described as "exemplary" is not necessarily to be construed as preferred or advantageous over other embodiments and/or to exclude the incorporation of features from other embodiments. The word "optionally" is used herein to mean "is provided in some embodiments and not provided in other embodiments". It is appreciated that certain features of the present disclosure, which are, for clarity, described in the context of separate embodiments, may also be provided in combination in a single embodiment. Conversely, various features of the present disclosure, which are, for brevity, described in the context of a single embodiment, may also be provided separately or in any suitable combination or as suitable in any other described embodiment of the disclosure.

What is claimed is:

1. A receiving network node comprising:
a first antenna array;
one or more radio frequency components;
one or more configurable loads;
a switch; and
a first control circuit,
wherein the first antenna array comprises one or more antennas arranged to be selectably coupled, via the switch, to the one or more radio frequency components or the one or more configurable loads, and
wherein the first control circuit is configured to:
obtain instruction data for configuring the first antenna array from a transmit-receive mode to a scattering mode;
configure, based on the instruction data the one or more configurable loads to scatter, by the configured first antenna array, a first beam of a radio frequency signal sent by a transmitting network node located in a first cell to a first user device located in a second cell;
control the switch to change a coupling of the one or more antennas from the one or more radio frequency components to the configured one or more configurable loads; and
set the one or more radio frequency components to an idle mode.

2. The receiving network node according to claim 1, wherein the first control circuit is further configured to release a radio resource control connection with the first user device.

3. The receiving network node according to claim 1, further comprising a second antenna array, wherein the first control circuit is further configured to:
set the second antenna array in a transmit-receive mode; and
communicate, concurrently to the scattering of the first beam of the radio frequency signal to the first user device, a second beam of a radio frequency signal to a second user device via the second antenna array.

4. The receiving network node according to claim 1, wherein the first antenna array is configured to perform a radio frequency communication in the transmit-receive mode and the scattering mode.

5. The receiving network node according to claim 1, further comprising a dedicated scattering array collocated with the first antenna array.

6. The receiving network node according to claim 1, wherein the first control circuit is further configured to communicate with a central unit or the transmitting network node to obtain the instruction data.

7. The receiving network node according to claim 1, wherein the receiving network node is at least one apparatus taken from the group consisting of: a cellular base station, and a user device.

8. A transmitting network node, comprising:
a third antenna array; and
a second control circuit, configured to:
select one or more antennas of the third antenna array to send a first beam of a radio frequency signal to a receiving network node, and
provide to the receiving network node instruction data for configuring a first antenna array of the receiving network node from a transmit-receive mode to a scattering mode,
wherein, based on the instruction data, the first antenna array is configured to scatter the first beam of the radio frequency signal to a first user device.

9. The transmitting network node according to claim 8, wherein the instruction data provided to the receiving network node comprises at least one of the group consisting of:
selection data for the first antenna array of the receiving network node to select which of one or more antennas of the first antenna array to couple to a configurable load;
configuration data to configure the configurable load; and
timing data to define a duration of time during which the first antenna array is set to maintain the scattering mode.

10. The transmitting network node according to claim 8, wherein the second control circuit is further configured to execute a channel sounding operation to determine if the first user device is detectable within the second cell.

11. The transmitting network node according to claim 8, wherein the second control circuit is further configured to:
establish a radio resource control connection with the first user device;
disconnect the first user device from the receiving network node; and
attach the first user device to the transmitting network node for the first user device to receive the first beam of the radio frequency signal scattered via the first antenna array.

12. The transmitting network node according to claim 8, wherein the second control circuit is further configured to select a beamforming scheme from a plurality of beamforming schemes to transmit the first beam of the radio frequency signal to the receiving network node, and
wherein the transmitted first beam of the radio frequency signal is scattered by at least one structure taken from the group consisting of:
the first antenna array configured in the scattering mode, and
a dedicated scattering array of the receiving network node.

13. The transmitting network node according to claim 12, wherein the selected beamforming scheme comprises a combination of:
a direct link between the transmitting network node and a second user device, and a scattered link between the transmitting network node and the first user device via the first antenna array of the receiving network node.

14. The transmitting network node according to claim 8, wherein the transmitting network node is at least one apparatus taken from the group consisting of: a cellular base station, and a user device.

15. A central communication device, comprising:
a third control circuit configured to:
   monitor wireless traffic to obtain wireless traffic load information associated with a plurality of radio resource units in a wireless network;
   send instruction data to a receiving network node that is based on the wireless traffic load information, wherein the instruction data is configured to instruct the receiving network node to switch a first antenna array of a radio resource unit of the receiving network node from a transmit-receive mode to a scattering mode; and
   control a transmitting network node located in a first cell to provide a first beam of a radio frequency signal to a first user device located in a second cell via the first antenna array configured in the scattering mode or a dedicated scattering array collocated with the first antenna array of the receiving network node.

16. The central communication device according to claim 15, wherein the third control circuit is further configured to determine, based on the monitored wireless traffic load information:
   one or more first radio resource units of the transmitting network node located in a first cell that are to remain active for a time period, and
   one or more second radio resource units of the receiving network node located in a second cell that are to be idle for the time period.

17. The central communication device according to claim 15, wherein the scattering mode is a mode, in which;
   one or more radio frequency components associated with the first antenna array of the receiving network node are in an idle mode, and
   a scattering characteristic of the first antenna array or the dedicated scattering array is in a controlled power state to deflect the first beam of the radio frequency signal to the first user device.

* * * * *